United States Patent
Kawakami et al.

(10) Patent No.: US 9,080,618 B2
(45) Date of Patent: Jul. 14, 2015

(54) LINE PRESSURE CONTROL APPARATUS AND METHOD FOR VEHICLE

(71) Applicant: JATCO LTD, Fuji, Shizuoka (JP)

(72) Inventors: Hiroki Kawakami, Fuji (JP); Shinya Mochiyama, Fuji (JP)

(73) Assignee: JATCO LTD, Fuji-shi (JP)

( * ) Notice: Subject to any disclaimer, the term of this patent is extended or adjusted under 35 U.S.C. 154(b) by 151 days.

(21) Appl. No.: 13/710,983

(22) Filed: Dec. 11, 2012

(65) Prior Publication Data

US 2013/0158761 A1 Jun. 20, 2013

(30) Foreign Application Priority Data

Dec. 19, 2011 (JP) ................................. 2011-277344

(51) Int. Cl.
| | | |
|---|---|---|
| *B60L 11/00* | (2006.01) | |
| *B60W 20/00* | (2006.01) | |
| *G06F 7/00* | (2006.01) | |
| *F16D 48/02* | (2006.01) | |
| *F16H 61/00* | (2006.01) | |
| *B60K 6/48* | (2007.10) | |
| *B60W 10/30* | (2006.01) | |
| *F16H 59/46* | (2006.01) | |

(52) U.S. Cl.
CPC . *F16D 48/02* (2013.01); *B60K 6/48* (2013.01); *B60W 10/30* (2013.01); *B60W 20/00* (2013.01); *F16H 61/0021* (2013.01); *F16H 61/0031* (2013.01); *B60K 2006/4825* (2013.01); *B60W 2710/1083* (2013.01); *F16H 2059/465* (2013.01); *F16H 2061/0087* (2013.01); *Y02T 10/6221* (2013.01); *Y02T 10/6252* (2013.01); *Y10S 903/946* (2013.01)

(58) Field of Classification Search
CPC ............ F16D 48/02; B60K 6/36; B60K 6/48; B60K 6/365; B60K 6/547; B60K 2006/4825; F16H 61/02; F16H 61/0021; F16H 61/0031; F16H 2059/465; F16H 2061/0087; B60W 10/30; B60W 20/00; B60W 20/30; B60W 2710/1083; Y10S 903/946
USPC ........................ 701/22, 51, 54; 903/903, 946; 180/65.265
See application file for complete search history.

(56) References Cited

U.S. PATENT DOCUMENTS

| | | | | |
|---|---|---|---|---|
| 5,263,906 | A | * | 11/1993 | Antonov .................... 475/257 |
| 5,884,601 | A | * | 3/1999 | Robinson ................ 123/196 S |
| 6,428,444 | B1 | * | 8/2002 | Tabata ........................... 477/3 |

(Continued)

FOREIGN PATENT DOCUMENTS

JP 2007-015679 A 1/2007

*Primary Examiner* — Fadey Jabr
*Assistant Examiner* — Angelina Shudy
(74) *Attorney, Agent, or Firm* — Foley & Lardner LLP

(57) ABSTRACT

In line pressure control apparatus and method for a vehicle, a line pressure controller outputs a line pressure command to reduce an indicated pressure toward a required indicated pressure by which a required pressure can be secured and which is lower than an initial stage indicated pressure from the initial stage indicated pressure preset to be higher than the required pressure, while a state of each of an electrically driven oil pump (sub-O/P) and a mechanical oil pump (M-O/P) enters a first region (a) and outputs the line pressure command to hold the indicated pressure at a time point at which the first region is ended, while the state enters a second region (b), when a hydraulic pressure source is transitioned from the electrically driven oil pump to the mechanical oil pump.

6 Claims, 19 Drawing Sheets

(56) References Cited

U.S. PATENT DOCUMENTS

| | | | |
|---|---|---|---|
| 6,445,992 B2* | 9/2002 | Wheeler et al. | 701/67 |
| 6,959,238 B2* | 10/2005 | Morishita et al. | 701/54 |
| 7,730,982 B2 | 6/2010 | Hidaka et al. | |
| 8,057,355 B2* | 11/2011 | Tryon et al. | 477/52 |
| 8,352,137 B2* | 1/2013 | Inagaki et al. | 701/55 |
| 8,715,135 B2* | 5/2014 | Ueda et al. | 477/3 |
| 8,763,736 B2* | 7/2014 | Mochiyama et al. | 180/65.21 |
| 8,833,335 B2* | 9/2014 | Karasawa | 123/196 R |
| 2002/0107103 A1* | 8/2002 | Nakamori et al. | 475/116 |
| 2003/0109970 A1* | 6/2003 | Nakamori et al. | 701/22 |
| 2003/0171867 A1* | 9/2003 | Nakamori et al. | 701/54 |
| 2004/0259682 A1* | 12/2004 | Tabata et al. | 477/102 |
| 2006/0272869 A1* | 12/2006 | Hidaka et al. | 180/65.2 |
| 2007/0175679 A1* | 8/2007 | Endo et al. | 180/65.2 |
| 2008/0200301 A1* | 8/2008 | Shimizu et al. | 477/2 |
| 2008/0234885 A1* | 9/2008 | Suzuki | 701/22 |
| 2008/0308355 A1* | 12/2008 | Kakinami et al. | 184/27.2 |
| 2009/0071142 A1* | 3/2009 | Kumazaki et al. | 60/428 |
| 2009/0074590 A1* | 3/2009 | Tsuda | 417/3 |
| 2009/0143193 A1* | 6/2009 | Ohshima et al. | 477/50 |
| 2009/0232673 A1* | 9/2009 | Reisch et al. | 417/364 |
| 2010/0075798 A1* | 3/2010 | Suzuki et al. | 477/5 |
| 2010/0279816 A1* | 11/2010 | Soliman | 477/3 |
| 2010/0311538 A1* | 12/2010 | Miyabe et al. | 477/2 |
| 2011/0129356 A1* | 6/2011 | Kobayashi et al. | 417/44.1 |
| 2011/0224879 A1* | 9/2011 | Waku et al. | 701/67 |
| 2011/0237394 A1* | 9/2011 | Hirai et al. | 477/167 |
| 2012/0062164 A1* | 3/2012 | Sano et al. | 318/721 |
| 2012/0103709 A1* | 5/2012 | Mochiyama et al. | 180/65.21 |
| 2012/0296509 A1* | 11/2012 | Wakita | 701/22 |
| 2013/0153354 A1* | 6/2013 | Colvin et al. | 192/3.58 |
| 2013/0260955 A1* | 10/2013 | Kimata et al. | 477/3 |
| 2013/0319366 A1* | 12/2013 | Karasawa | 123/196 R |

\* cited by examiner

LINE PRESSURE CONTROL APPARATUS AND METHOD FOR VEHICLE

BACKGROUND OF THE INVENTION (1) Field of the Invention

The present invention relates to line pressure control apparatus and method for a vehicle which are capable of producing a line pressure which is a basic pressure of a controlled hydraulic pressure for a predetermined hydraulic pressure engagement frictional elements based on discharge pressures from two oil pumps.

(2) Description of Related Art

In a hybrid vehicle constituted by a hybrid drive train in which an engine, a first clutch, a motor•generator, and a second clutch (automatic transmission) and driving wheels are serially connected in this order, the first and second clutches are hydraulic pressure clutches whose engagement and release are controlled by means of working oil (or hydraulic oil). In such a hybrid vehicle as described above, in an EV mode in which the engine is stopped and the vehicle is traveling only with the motor•generator as a power source, the first clutch is released and, in a HEV mode in which the vehicle is traveling with the engine and the motor•generator as power sources, the first clutch is engaged (for example, refer to a Japanese Patent Application Publication No. (tokkai) 2007-015679 published on Jan. 25, 2007 (which corresponds to a United States Patent Application Publication US2006/0272869 A1 (published on Dec. 7, 2006)).

In the above-described hybrid vehicle, at a time of the HEV traveling mode or EV traveling mode, a discharge pressure from an oil pump (hereinafter, referred to as a mechanical oil pump M-O/P) rotationally driven by means of an input shaft of a transmission is used to control a line pressure. In addition, during a vehicle stop or during a vehicle start region, the discharge pressure from an electrically driven oil pump driven by an electrically operated motor is used to control the line pressure. The electrically operated motor is used to supply the hydraulic pressure to the first clutch (a normal close type) and second clutch.

SUMMARY OF THE INVENTION

However, in a previously proposed hybrid vehicle described above, the mechanical oil pump and the electrically operated oil pump are, respectively, parallelized to each other. Then, the electrically operated motor is a torque control system which performs a constant control for a torque of an output shaft of the electrically operated motor. Therefore, even if an indicated hydraulic pressure is increased in response to a line pressure command during an operation of only the electrically operated motor, a revolution speed of the electrically operated motor is not raised. Hence, the pressure more than a required pressure is not discharged. Hence, under a driving region such that only the electrically operated oil pump is actuated (hereinafter, referred to as a first region (a)), at a transfer transient timing (referred to as a second region (b)) to the mechanical oil pump in which the discharge pressure is raised in accordance with a rise in the input revolution speed of the transmission from the electrically operated oil pump, a line pressure command is commanded at a high value to the discharge pressure to prepare for a region (hereinafter, referred to as a third region (c)). Thus, a hydraulic pressure response characteristic is secured.

For example, at a time of HEV start, the hydraulic pressure source is transferred as follows: electrically driven oil pump (a)→electrically operated oil pump+mechanical oil pump (b)→mechanical oil pump (c). Even if the hydraulic pressure source is transferred to second region (b) in which both of electrically driven oil pump and mechanical oil pump are operated, a line pressure command at a time of first region (a) in which the electrically operated motor is activated is held. At this time, depending upon a manner of rise in the hydraulic pressure of the mechanical oil pump, the actual line pressure in the second region (b) of first region (a) in which the electrically operated motor is activated becomes excessively high so that a fuel economy performance is reduced. On the other hand, from a viewpoint of placing importance on fuel economy, the line pressure command is positively reduced to the necessary pressure at the time of second region (b). In this case, when a slip control such that a clutch pressure is feedback controlled in order for the second clutch to be in a predetermined difference revolution is executed, an interference such that the reduction of the line pressure command and the feedback control of the clutch pressure during the slip control occurs and a variation of the actual clutch pressure is induced. Consequently, a judder due to the variation of the second clutch pressure is brought out.

It should be noted that "Judder" is a phenomenon such that an abnormal sound or vibration is brought out due to no advance of the engagement or release of a clutch or brake (a component utilizing a friction) through which the power is transmitted due to the presence of friction.

It is, therefore, an object of the present invention to provide line pressure control apparatus and method for a vehicle which are capable of performing the line pressure control achieving a compatibility of both of an improvement in the fuel economy (performance) and a prevention of the judder, when the hydraulic pressure source is transferred from the electrically driven pump to the mechanical oil pump.

In order to achieve the above-described object, according to one aspect of the present invention, there is provided a line pressure control apparatus for a vehicle, having a mechanical oil pump, an electrically driven oil pump, and a line pressure controller. The mechanical oil pump is pumping actuated by a drive through a traveling drive source. The electrically driven oil pump is disposed in parallel to the mechanical oil pump on a hydraulic pressure circuit and pumping actuated by the drive through an electrically operated motor. The line pressure controller outputs a line pressure command to produce a line pressure which is a basic pressure of a controlled hydraulic pressure for a predetermined hydraulic pressure engagement frictional element arranged in a drive train, with either or each of the electrically driven oil pump and the mechanical oil pump as a hydraulic pressure source. The line pressure controller outputs a line pressure command by which a target pressure is obtained as follows when the hydraulic pressure source is transitioned (transferred) from the electrically driven oil pump to the mechanical oil pump. That is to say, the line pressure controller outputs the line pressure command to reduce an indicated pressure toward a required indicated pressure by which a required pressure can be secured and which is lower than an initial stage indicated pressure from the initial stage indicated pressure preset to be higher than the required pressure, while a state of each of the electrically driven oil pump and the mechanical oil pump enters a first region in which only the electrically driven oil pump is the hydraulic pressure source and a discharge pressure of the mechanical oil pump can be confirmed. The line pressure controller outputs the line pressure command while the state of each of the electrically driven oil pump and the mechanical oil pump enters a second region in which both of the electrically driven oil pump and the mechanical oil pump are the hydraulic pressure sources, when the hydraulic pressure source is transitioned from the electrically driven oil pump to the mechanical oil pump.

According to another aspect of the present invention, there is provided a line pressure control method for a vehicle, comprising: providing a mechanical oil pump pumping actuated by a drive through a traveling drive source; and providing an electrically driven oil pump disposed in parallel to the mechanical oil pump on a hydraulic pressure circuit and pumping actuated by the drive through an electrically operated motor; and outputting a line pressure command through a line controller to produce a line pressure which is a basic pressure of a controlled hydraulic pressure for a predetermined hydraulic pressure engagement frictional element arranged in a drive train, with either or each of the mechanical oil pump and the electrically driven oil pump as a hydraulic pressure source, wherein the line pressure control method further comprises outputting the line pressure command through the line pressure controller to reduce an indicated pressure toward a required indicated pressure by which a required pressure can be secured and which is lower than an initial stage indicated pressure from the initial stage indicated pressure preset to be higher than the required pressure, while a state of each of the electrically driven oil pump and the mechanical oil pump enters a first region in which only the electrically driven oil pump is the hydraulic pressure source and a discharge pressure of the mechanical oil pump can be confirmed, and outputting the line pressure command through the line pressure controller to hold the indicated pressure at a time point at which the first region is ended, while the state of each of the electrically driven oil pump and the mechanical oil pump enters a second region in which both of the electrically driven oil pump and the mechanical oil pump are the hydraulic pressure sources, when the hydraulic pressure source is transitioned from the electrically driven oil pump to the mechanical oil pump.

DETAILED DESCRIPTION OF THE INVENTION

Hereinafter, a best mode embodiment which achieves a line pressure control apparatus for a vehicle will be described on a basis of the accompanied drawings.

Embodiment

First, a structure of the line pressure control apparatus in the preferred embodiment according to the present invention will be explained by dividing the explanation of the structure into "a whole system configuration", "a line pressure control mechanism", "a line pressure control process structure", "a calculation process structure of a first learning value in a line pressure control", and "a second learning value calculation process structure in the line pressure control".

Figure 1:
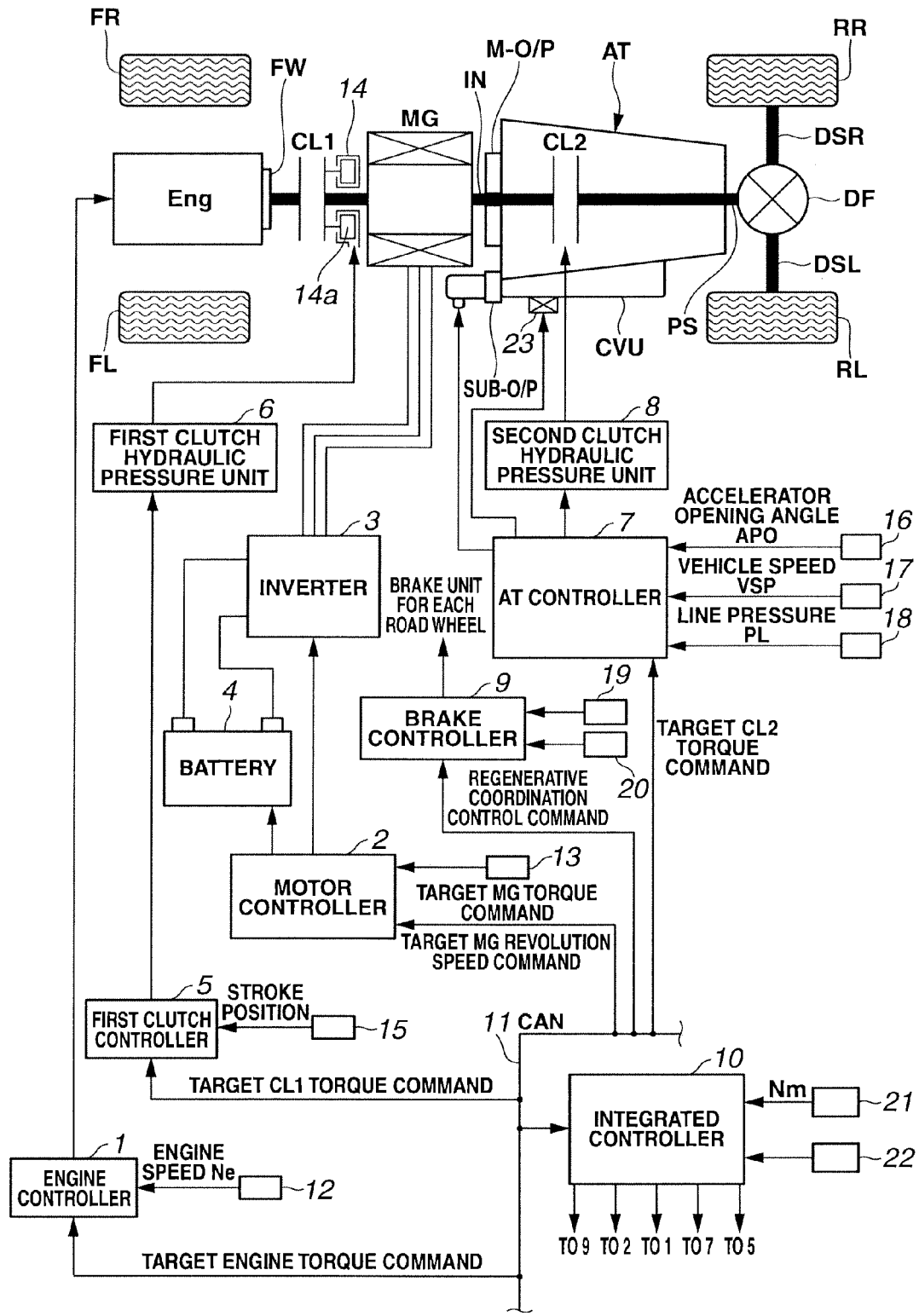
FIG. 1 is a whole system configuration view of an FR (Front-engine-and-Rear-drive) hybrid vehicle which is a rear road wheel drive and to which a line pressure control apparatus for a vehicle in a preferred embodiment according to the present invention is applicable.
Figure 2:
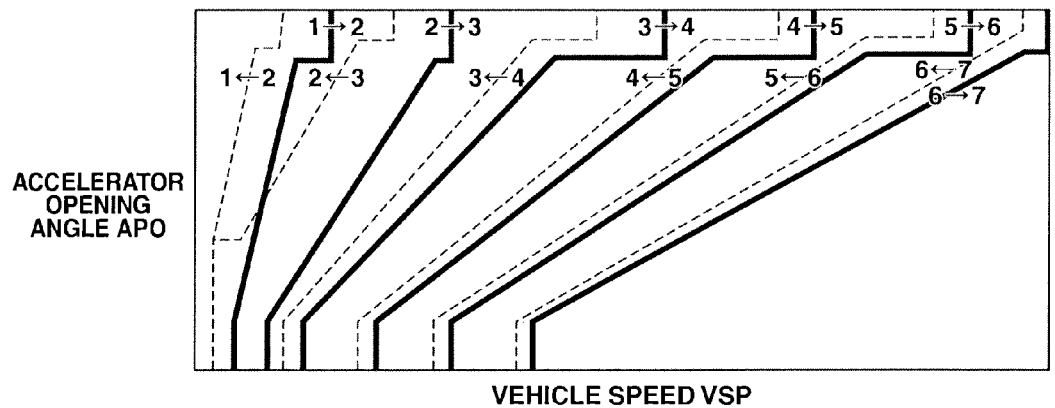
FIG. 2 is a gear shift line (schedule) diagram representing an example of gear shift lines used in a gear shift control in an AT controller of a hybrid vehicle drive train shown in FIG. 1.
Figure 3:
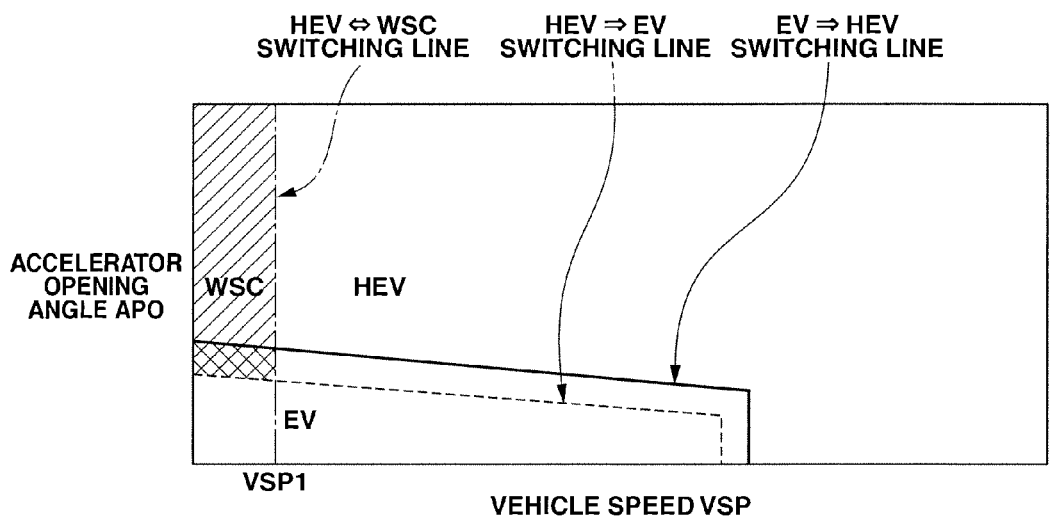
FIG. 3 is a traveling mode selection map view representing an example of a traveling mode selection map used in a traveling mode transition control in an integrated controller of the hybrid vehicle system shown in FIG. 1.
Figure 4:
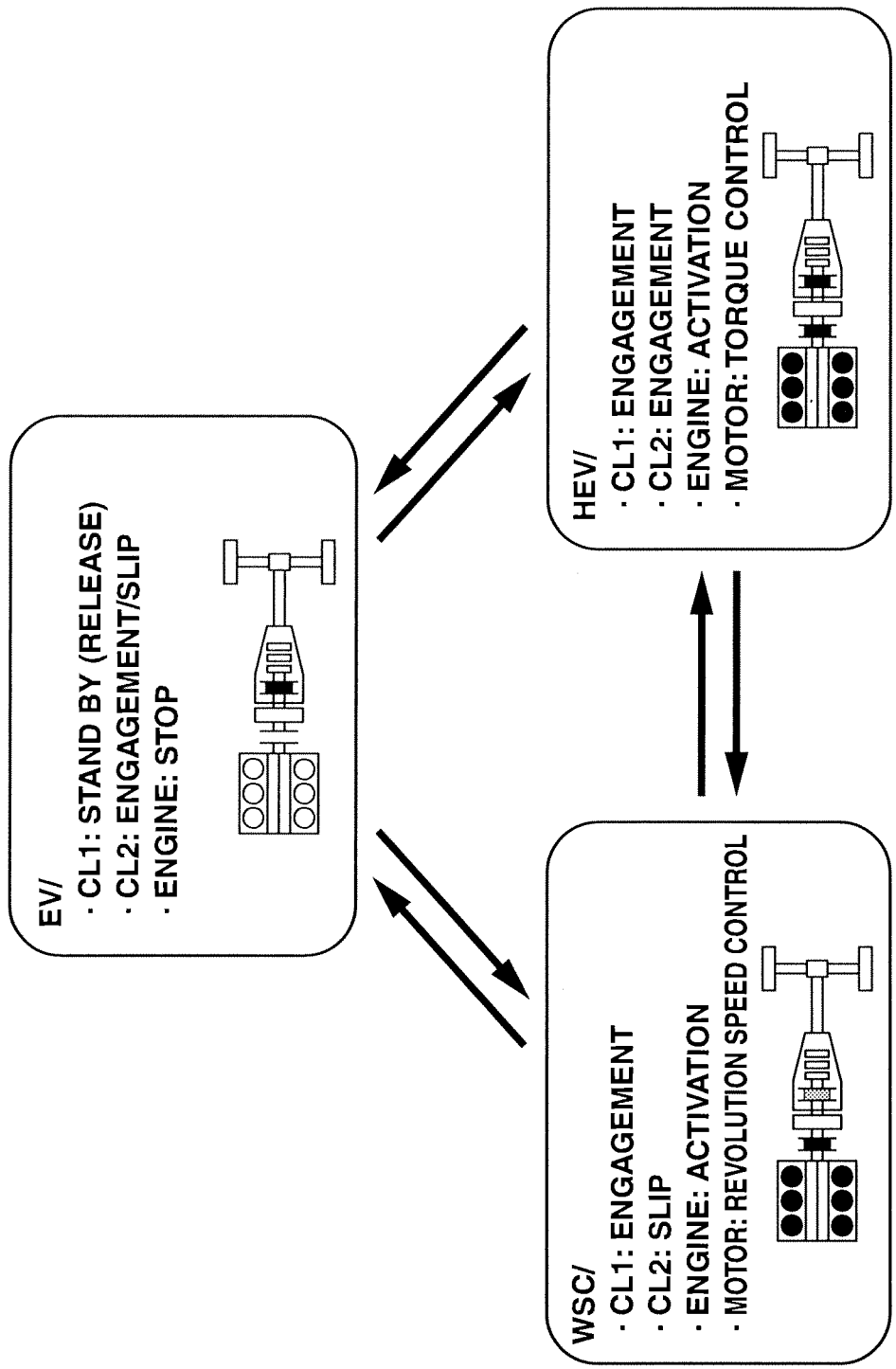
FIG. 4 is a mode transition explanatory view representing a mode transition among representative EV mode, HEV mode, and WSC mode in a traveling mode transition control executed by the integrated controller shown in FIG. 1.

[Whole System Configuration]
FIG. 1 shows an FR hybrid vehicle to which a line pressure control apparatus for a vehicle in a preferred embodiment according to the present invention is applicable. FIG. 2 shows a shift schedule (shift line) diagram. FIG. 3 shows a traveling mode selection map. FIG. 4 shows a transition pattern in the traveling mode. Hereinafter, the whole system configuration will be explained on a basis of FIGS. 1 through 4.

A drive system (drive train) of the FR hybrid vehicle in the preferred embodiment, as shown in FIG. 1, includes an engine Eng (a traveling drive source); a flywheel FW; a first clutch CL1; a motor/generator MG (the traveling drive source); a second clutch CL2; an automatic transmission AT; a propeller shaft PS; a differential DF; a left drive shaft DSL; a right drive shaft DSR; a left rear road wheel RL; and a right rear road wheel RR. It should be noted that M-O/P (or mechanical O/P) denotes a mechanical oil pump (or mecha oil pump), Sub-O/P (or S-O/P) denotes an electrically driven oil pump, FL denotes a left front road wheel, and FR denotes a right front road wheel.

Automatic transmission AT is a multi-step-geared transmission which automatically switches a gear shift stage at a limited step in accordance with an accelerator opening angle and a vehicle speed and is constituted by the multi-step-geared transmission having, for example, forward 7 speed/reverse 1 speed gear shift stage. Then, as a second clutch CL2, a clutch element (a multiple plate clutch or a multiple plate brake) which conforms to a predetermined condition such as an engagement condition from among a plurality of clutch elements engaged at respective gear shift stages of automatic transmission is selected at each of the gear shift stages without a new addition as an independent exclusive clutch as a second clutch CL2.

Mechanical oil pump M-O/P is attached onto a transmission input shaft IN of automatic transmission AT and is a pump operated according to a rotational drive force from at least one of engine E/G and motor/generator MG.

Electrically driven oil pump S-O/P is a pump operated by means of a rotational driving force of electrically operated motor S-M (refer to FIG. 5) in order to secure the line pressure required in the system when the discharge pressure from mechanical M-O/P at the time of a vehicle stop or vehicle start becomes insufficient.

The FR hybrid vehicle includes the drive system having one-motor-and-two-clutch drive train. As a traveling mode due to the difference between driving modes, the FR hybrid vehicle includes an electric automotive vehicle mode (hereinafter, referred as to an EV mode, a hybrid vehicle mode (hereinafter, referred as to a HEV mode), and a drive torque control mode (hereinafter, referred to as a WSC (Wet Start Clutch) mode).

The above-described EV mode is a mode in which the vehicle travels only the driving force of motor/generator MG with first clutch CL1 released and has the motor traveling mode and the regenerative traveling mode. This "EV mode" includes a motor traveling mode and regenerative traveling mode. This EV mode is basically selected when a required driving force is low and a battery SOC (State Of Charge (a battery capacity that can actually be used)) is secured.

The above-described HEV mode is a mode in which the vehicle travels as an engagement state of first clutch CL1, includes a motor assistance traveling mode, a power generation traveling mode, and an engine traveling mode, and a motor traveling mode, a regenerative traveling mode. This HEV mode is basically selected when the requested driving force is high or battery SOC becomes insufficient.

The above-described WSC mode holds second clutch CL2 in a slip engagement state according to a revolution speed control of motor/generator MG and is a mode in which the vehicle travels while controlling a clutch torque capacity such that a clutch transmission torque passing through second clutch CL2 becomes a requested drive torque determined according to a vehicle state and according to an acceleration operation of a driver. This "WSC mode" is selected in a traveling region such that the engine speed is below an idling speed during a vehicle stop, a vehicle start, a deceleration in the selection state of the EV mode.

Next, a control system of the FR hybrid vehicle will be explained below.

A control system of the FR hybrid vehicle, as shown in FIG. 1, includes: an engine controller 1; an inverter 3; a first clutch controller 5, a first clutch hydraulic pressure unit 6; an AT controller (line pressure control means) 7; a second clutch hydraulic unit 8; a brake controller 9; and an integrated controller 10. It should be noted that a CAN communication line (CAN (car network area)) which enables a mutual information exchange between each controller 1, 2, 5, 7, 9 and integrated controller 10.

Engine controller 1 inputs an engine revolution speed information from engine speed sensor 12; a target engine torque command from integrated controller 10; and other necessary information. Then, a command to control engine operating point (Ne. Te) is outputted to a throttle valve actuator of engine Eng.

Motor controller 2 inputs the information from a resolver 13 detecting a revolution position of the rotor of motor/generator MG, target MG torque command and target MG revolution speed command from integrated controller 10, and other necessary information. A command to control a motor operating point (Nm, Tm) is outputted from motor controller MG. It should be noted that this motor controller 2 monitors battery SOC representing a charge quantity of battery 4 and this battery information SOC is supplied to integrated controller 10 via CAN communication line 11.

First clutch controller 5 inputs a sensor information from first clutch stroke sensor 15 detecting a stroke position of piston 14a of hydraulic pressure actuator 14; a target CL1 torque command from integrated controller 10; and other required information. Then, a command to control an engagement, a half engagement, and a release of first clutch CL1 is output to first clutch hydraulic pressure unit 6.

AT controller 7 inputs the information from accelerator opening angle sensor 16, vehicle speed sensor 17, and line pressure sensor 18 and performs gear shift control, a line pressure control, a pump transition control, and a CL2 slip control.

[Gear shift control] is performed in such a way that a most appropriate (an optimum) gear shift stage is searched according to a position of a driving point determined according to an accelerator opening angle APO and vehicle speed VSP present on a shift map shown in FIG. 2 and is carried out by outputting a control command which achieves the searched gear shift stage from AT controller 7 to a shift solenoid of hydraulic pressure control valve unit CVU.

[Line pressure control] is a control of a line pressure PL which is a basic pressure of a controlled hydraulic pressure to a hydraulic pressure system (an automatic transmission AT including first clutch CL1 and second clutch CL2) intervened in the hybrid drive train by means of a line pressure command to a line pressure solenoid 23 (shown in FIG. 1). In an ordinary control, a maximum required hydraulic pressure is a target line pressure from among the required hydraulic pressure at each hydraulic pressure engagement frictional element in the hydraulic pressure system and the line pressure command is output to obtain the target line pressure with the maximum required hydraulic pressure as a target line pressure.

[Pump Transition Control]
While the rotational driving force from at least one of engine Eng and motor/generator MG becomes insufficient, electrically driven oil pump Sub-O/P is selected while at lease one of engine Eng and motor/generator MG and mechanical oil pump M-O/P is selected while the rotational driving force is sufficient. That is to say, during the vehicle start from a vehicle stopped state, such a control that the hydraulic pressure source is transferred from the selection of electrically driven oil pump Sub-O/P to mechanical oil pump M-O/P is performed. In addition, during the stop of the traveling from the driving state of the vehicle, such a control that the hydraulic pressure source is transferred from the selection of mechanical oil pump M-O/P to the selection of electrically operated oil pump Sub-O/P is performed.

[CL2 slip control] is a control to make a slip engagement of second slip CL2 by means of an engagement torque capacity control of second clutch CL2. When the vehicle is started by means of "WSC mode" and while a transition of mode from HEV mode to EV mode, and so forth is executed, the CL2 slip control is performed. The reason that the CL2 slip control is performed during the start of the vehicle in the WSC mode is that a difference revolution absorbing element such as a torque converter is not provided in the hybrid drive train. In addition, the CL2 slip control is performed at a time of the mode transition is to interrupt the variation torque at the drive source side from being directly transmitted to the driving wheels due to the mode transition along with an engine start control or an engine stop control. It should be noted that, during the CL2 slip control, a CL2 control flag is set to be "1".

Brake controller 9 inputs sensor information from road wheel speed sensors 19 detecting each road wheel speed of four wheels and brake sensor information from brake pedal stroke sensor 20; a regenerative coordination control command from integrated controller 10; and other necessary information. Then, in a case where, for example, during the brake operation, it becomes insufficient only by means of the regenerative braking force for the required driving force determined from brake stroke BS during the brake pedal depression braking, the insufficient quantity of required braking force performs the regenerative coordinate brake control to compensate for the mechanical braking force (liquid pressure braking force and motor braking force).

Integrated controller 10 manages a consumed energy of the whole vehicle, plays a function of running a vehicle at a maximum efficiency, and inputs the necessary information from motor speed sensor 21 detecting motor speed Nm and other sensors and switches 22 and information via CAN communication line 11. For example, integrated controller 10 outputs the target engine torque command to engine controller 1, a target MG torque command and a target MG revolution speed command to motor controller 2, a target CL1 torque command to first clutch controller 5, a target CL2 torque command to AT controller 7, a regenerative coordinate control command to brake controller 9.

Integrated controller 10 searches an optimum traveling mode determined according to the position of the driving point determined by accelerator opening angle APO and vehicle speed VSP present on the traveling mode selection map shown in FIG. 3 and performs a traveling mode selection control selecting the searched traveling mode as a target traveling mode. In the traveling mode selection map, EV→HEV switching line switched from the EV mode to the HEV mode when the driving point (APO, VSP) present in the EV region traverses this switching line, HEV→EV switching line switched from the HEV mode to the EV mode when the driving point (APO, VSP) present in the HEV region traverses this switching line, and HEV⇔WSC switching line switched between the HEV mode and the WSC mode when the driving point (APO, VSP) traverses this switching line are set. Both of EV→HEV switching line and HEV→EV switching line are set to have hysterisis between EV region and HEV region as a division line between HEV mode and EV mode. The EV→HEV switching line is set along first set vehicle speed VSP1 at which engine Eng holds the idling speed when automatic transmission AT is at a 1-speed stage. FIG. 4 shows mode transition states between respective modes and a difference between the HEV mode, the EV mode, and the WSC mode. It should be noted that, during the selection of EV mode, if a battery SOC is equal to or lower than a predetermined value, the traveling mode is forcibly set to the HEV mode in spite of the target traveling mode in the traveling mode selection map.

Figure 5:
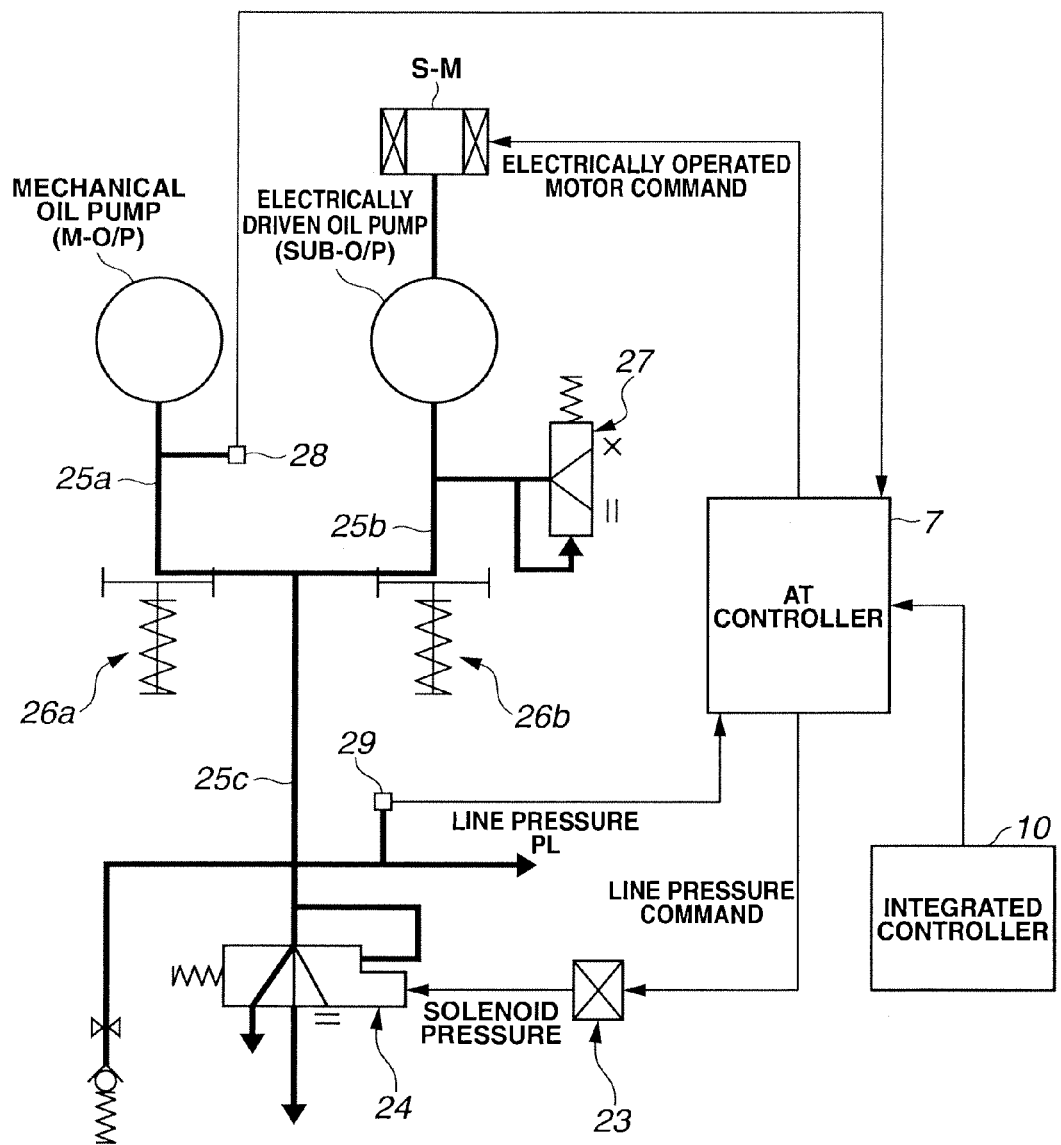
FIG. 5 is a rough view representing a line pressure control mechanism used in a line pressure control in an AT controller in the hybrid vehicle system.

[Line Pressure Control Mechanism]
FIG. 5 is a line pressure control mechanism in the FR hydroid vehicle in the preferred embodiment. Hereinafter, the line pressure control mechanism will be explained on a basis of FIG. 5.

In this embodiment, the line pressure control mechanism, as shown in FIG. 5, includes mechanical oil pump M-O/P; electrically driven oil pump Sub-O/P; AT controller 7 (a line pressure controller); integrated controller 10; a line pressure solenoid 23; and a pressure regulator valve 24.

Each or either of mechanical oil pump M-O/P and electrically driven oil pump Sub-O/P serves as a hydraulic pressure source disposed in parallel to each other on a hydraulic pressure circuit and which produces a controlled hydraulic pressure for first and second clutches CL1, CL2 and the controlled hydraulic pressure for automatic transmission AT. A torque control method is adopted for electrically driven oil pump Sub-O/P. Especially, at the time of the vehicle stop or the vehicle start, the discharge pressure from electrically driven oil pump Sub-O/P is supplied at a constant value so that the discharge pressure can be used without wasteful consumption.

First discharge pressure oil passage 25a, second discharge pressure oil passage 25b, a joint discharge pressure oil passage 25c (a line pressure oil passage), flapper valves 26a, 26b, and a relief valve 27 are disposed among mechanical oil pump M-O/P, electrically driven oil pump Sub-O/P, and pressure regulator valve 24.

Flapper valves 26a, 26b are disposed respectively in first discharge pressure oil passage 25a and second discharge pressure oil passage 25b and each flapper valve 26a, 26b has a characteristic such as to be opened when a pump discharge pressure is equal to or larger than a predetermined value (a value determined by the biasing force by means of its spring so that the pump discharge pressure is supplied to joint discharge pressure oil passage 25c located at the downstream side of each flapper valve. In addition, each flapper valve 26a, 26b has a function as a check valve (reverse flow preventing valve) which is not caused to flow from the downstream side (joint discharge pressure oil passage) to upstream side (each discharge pressure oil passage 25a, 25b).

Relief valve 27 is disposed in a branch oil passage from second discharge pressure oil passage 25b and limits the discharge pressure of second discharge pressure oil passage 25b so as not to exceed an upper limit pressure.

In addition, a discharge pressure sensor 28 to monitor the discharge pressure from mechanical oil pump M-O/P and discharge pressure sensor 28 is disposed in first discharge pressure oil passage 25a to monitor the discharge pressure from mechanical oil pump M-O/P. Furthermore, a line pressure sensor 29 is disposed in joint discharge pressure oil passage 25a which is a line pressure oil passage to monitor line pressure PL and theses sensor information are supplied to AT controller 7.

Pressure regulator valve 24 is a pressure regulating valve which regulates line pressure PL based on discharge pressure from the hydraulic pressure source which is at least one or each of mechanical oil pump M-O/P and electrically driven oil pump Sub-O/P with the solenoid pressure from line pressure solenoid 23 and PL feedback pressure as working signal pressures.

Line pressure solenoid 23 is a valve producing the solenoid pressure in accordance with the line pressure command upon a receipt of the line pressure command by means of a duty solenoid command from AT controller 7, with a pilot pressure according to a constant pressure as the basic pressure. That is to say, line pressure PL is pressure adjusted by means of pressure regulator valve 24 in accordance with a line pressure command output from AT controller 7 to line pressure solenoid 23.

[Line Pressure Control Process Structure]

Figure 6:
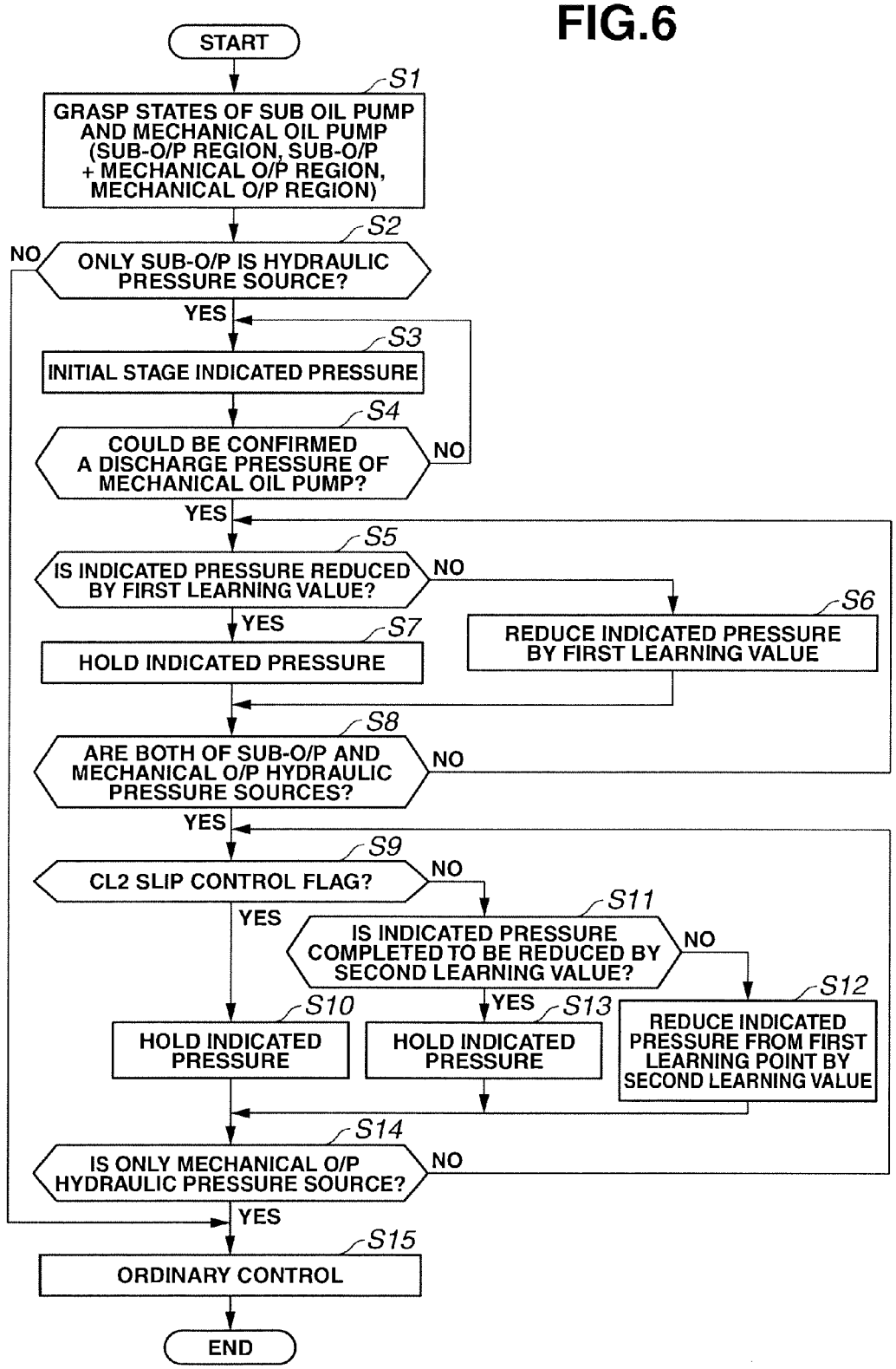
FIG. 6 is a flowchart representing a flow of a line pressure control executed by an AT controller in the preferred embodiment shown in FIG. 1.

FIG. 6 shows a stream of a line pressure control process executed by AT controller 7 in this embodiment (a slip control intervention corresponding control section). Hereinafter, each step shown in FIG. 6 representing a line pressure control process structure will be described below.

At a step S1, AT controller 7 grasps states of mechanical oil pump (=mechanical O/P) and electrically driven oil pump S-O/P (=sub O/P) and the routine goes to a step S2.

The state grasping is such that whether electrically driven oil pump Sub-O/P is under an operation and discharge pressure sensor 28 detects that the pressure equal to or lower than the pressure indicating the open of flapper valve 26a (the present region is in a sub-O/P region), whether, while the electrically driven oil pump is being operated, discharge pressure sensor 28 detects the pressure equal to or higher than open of flapper valve 26a (the present region is in a sub-O/P+mechanical O/P region), and whether the state enters mechanical O/P region in which, while electrically operated oil pump S-O/P is stopped and discharge pressure sensor 28 detects the pressure equal to or higher than the pressure indicating the open of flapper valve 26a.

At step S2, subsequent to the pump state grasping at step S1, AT controller 7 determines whether, from both of mechanical oil pump M-O/P and electrically driven oil pump sub-O/P, the hydraulic pressure source is only sub-O/P. In a case where YES (the hydraulic pressure source is only sub-O/P), the routine goes to a step S3. If No (mechanical O/P is included in the hydraulic pressure source), the routine goes to a step S15. It should be noted that "the hydraulic pressure source is only sub-O/P" is said to be when the pressure equal to or lower than that indicating the open of flapper valve 26a is detected by means of discharge pressure sensor 28 even if mechanical O/P is being operated.

At step S3, subsequent to the determination that only sub-O/P is the hydraulic pressure source at step S2 or the determination that the discharge pressure of mechanical O/P is not confirmed at step S4 (as will be described later), AT controller 7 outputs an initial stage indicated pressure which is preset to be higher than the required pressure (necessary pressure).

At step S4, subsequent to the output of the initial stage indicated pressure at step S3, AT controller 7 determines whether the discharge pressure from mechanical oil pump M-O/P based on the sensor information from discharge pressure sensor 28 could be confirmed and, if Yes (mechanical O/P pressure is confirmed) the routine goes to a step S5. If No (no confirmation of the mechanical O/P pressure), the routine returns to step S3.

At step S5, AT controller 7 subsequent to the determination that the mechanical oil pump pressure at step S4 has been confirmed, or subsequent to the determination that neither sub-O/P nor mechanical O/P is the hydraulic pressure source at step S8, a reduction in first learning value Lv1 of indicated pressure (as will be described later) has been completed. In a case of YES (reduction by the first learning value is complete), the routine goes to a step S7. If NO (reduction by the first learning value is incomplete), the routine goes to a step S6.

At step S6, AT controller 7, subsequent to the determination that the reduction of the indicated pressure by the first learning value is incomplete at step S5, outputs the line pressure command to reduce the indicated pressure by first learning value Lv1 and the routine goes to a step S8.

At step S7, subsequent to the determination that the reduction in the first learning value is incomplete at step S5, the line pressure command holding the indicated pressure reduced by first learning value Lv1 is outputted and the routine goes to step S8.

At step S8, subsequent to the output of indicated pressure reduction command at step S6, or subsequent to the output of the indicated pressure hold command at step S7, AT controller 7 determines whether both of electrically driven oil pump S-O/P (=sub-O/P) and mechanical oil pump M-O/P are hydraulic pressure sources. If YES (both of sub-O/P and mechanical O/P are hydraulic pressure sources), the routine goes to a step S9. If NO (mechanical O/P is not included in the hydraulic pressure sources), the routine returns to step S5. It should be noted that the fact that both of sub-O/P and mechanical O/P are the hydraulic pressure sources means that both of flapper valve 26a at mechanical oil pump M-O/P side and flapper valve 26b only at electrically driven oil pump sub-O/P side are open.

At step S9, subsequent to the determination that both of sub OP and mechanical OP are the hydraulic pressure sources, or subsequent to the determination that the sub-O/P at step S14 is included in the hydraulic pressure sources, the determination is made by AT controller 7 that CL2 slip control is executed. If YES (under the execution of CL2 slip control), the routine goes to step S10. If NO (under no execution of the CL2 slip control) at step S11, the present routine goes to a step S11. It should be noted that the determination of whether the CL2 slip control is being executed or not depends upon whether CL2 slip control flag is set to 1 or not.

At step S10, subsequent to the determination that the CL2 slip control is being executed at step S9, the line pressure command is outputted to hold the indicated pressure at a time point at which the CL2 slip control execution is transferred and the routine goes to a step S14.

At step S11, AT controller 7, subsequent to the determination that the CL2 slip control is not executed at step S9, determines whether the reduction of the indicated pressure by second learning value Lv2 (as will be described later) has been completed. If Yes (the reduction by the second learning value has been completed), the routine goes to a step S13. If No (not reduced by the second learning value), the routines goes to a step S12.

At step S12, AT controller 7 outputs the line pressure command to hold the indicated pressure reduced by second learning value Lv2, subsequent to the determination that the reduction by the second learning value at step S11 is incomplete and the routine goes to step S14.

At step S13, AT controller 7 outputs the line pressure command to hold the indicated line pressure by second learning value Lv2, subsequent to the determination that the reduction by the second learning value is complete at step S11 and the routine goes to a step S14.

At step S14, subsequent to an output of indicated pressure hold command at step S10, or subsequent to the output of the indicated pressure reduction command at step S12, or subsequent to the output of the indicated pressure holding command at step S13, or the determination that only mechanical OP is the hydraulic pressure source only by means of mechanical OP. If YES (only the hydraulic pressure source only by mechanical OP), the routine goes to a step S15 and if NO (the subOP is included in the hydraulic pressure source), the routine returns to step S9.

It should be noted that the fact that only mecha OP (mechanical oil pump) is the hydraulic pressure source is that electrically driven oil pump S-O/P is being stopped with the pressure equal to or larger than that indicating the open of flapper valve 26a.

At step S15, AT controller 7 subsequent to the determination that mechanical O/P at step S2 is included in the hydraulic pressure source or subsequent to the determination that only mechanical oil pump (mechanical O/P) is the hydraulic pressure source at step S14 and, thereafter, an ordinary control such that the line pressure command according to the indicated pressure along the target line pressure is output is executed and the routine is ended.

[First Learning Value Calculation Processing in the Line Pressure Control]

Figure 7:
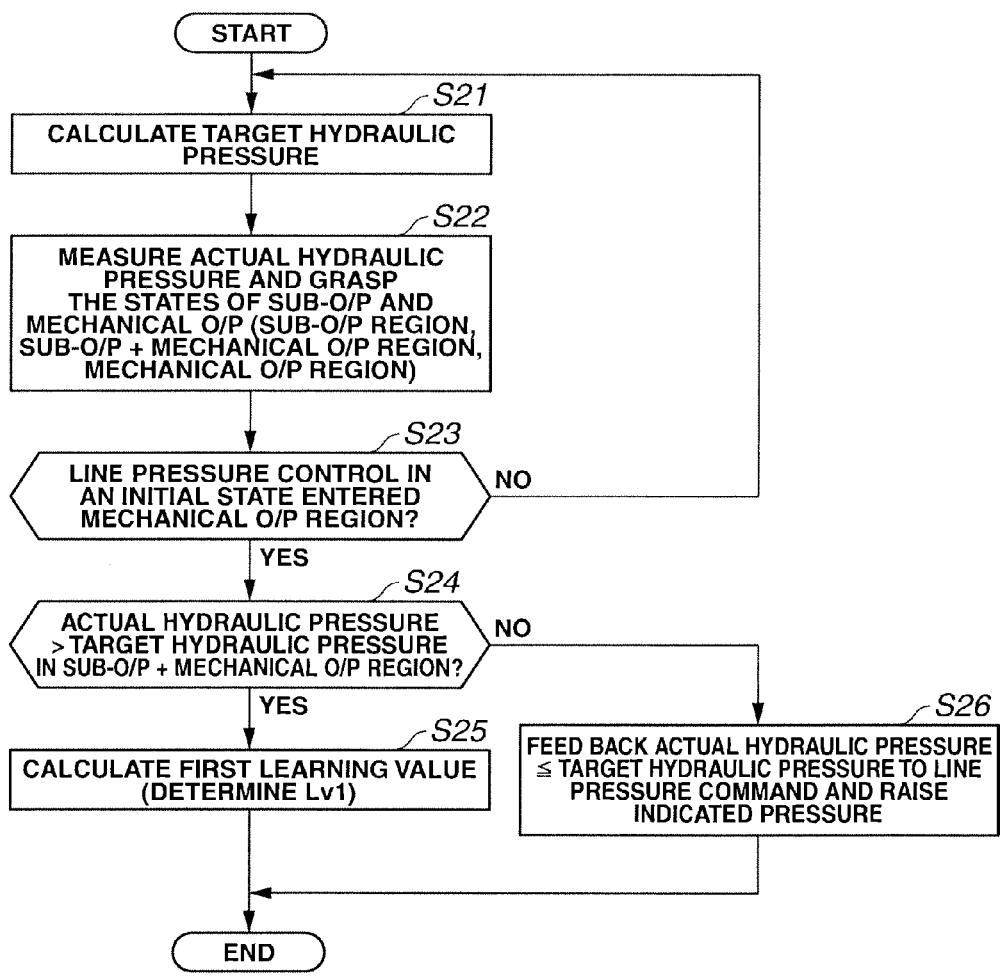
FIG. 7 is a flowchart representing a flow of a first learning value calculation processing executed by the AT controller in the embodiment shown in FIG. 1.

FIG. 7 shows (learning value calculation section) representing the flow of the first learning value calculation processing executed by AT controller 7 in the preferred embodiment according to the present invention. Each step in FIG. 7 represents the calculation process of first learning value Lv1 in the line pressure control. It should be noted that the first learning value calculation processing is started when the line pressure command which obtains the initial stage indicated pressure preset to be higher than the required pressure in the first region (hydraulic pressure source of only sub-O/P) and in the second region (hydraulic pressure sources of both of sub-O/P and mechanical O/P).

At a step S21, AT controller 7 calculates a target hydraulic pressure (=a target line pressure) according to a maximum pressure from among respective required hydraulic pressures at a plurality of hydraulic pressure engagement frictional elements at automatic transmission AT, subsequent to the start of routine in FIG. 7 or subsequent to the time before the entry into the to mechanical oil pump (M-O/P) region at step S23 and the routine goes to a step S22.

At step S22, AT controller 7, subsequent to the calculation of the target hydraulic pressure at step S21, measures an actual hydraulic pressure PL by means of line pressure sensor 29 and performs the state grasping of mechanical oil pump M-O/P and electrically driven oil pump Sub-O/P in the same way as step S1.

At step S23, AT controller 7 determines whether the line pressure control in the initial state falls from sub-O/P+mechanical O/P (mechanical oil pump) region to the mechanical oil pump (mechanical O/P) region, subsequent to the state grasping of sub-O/P and mechanical O/P and subsequent to the measurement of the actual hydraulic pressure at step S21. If Yes (entered to mechanical O/P region), the routine goes to a step S24. If No (before the enter into mechanical O/P region), the routine returns to step S22.

At step S24, AT controller 7 determines whether actual hydraulic pressure>target hydraulic pressure in sub-O/P+mechanical O/P region, subsequent to the determination that the present state enters mechanical O/P region at step S23. If Yes (actual hydraulic pressure>target hydraulic pressure), the routine goes to a step S25. If No (actual hydraulic pressure≤target hydraulic pressure) at step S24, the routine goes to a step S26. It should be noted that, for the actual hydraulic pressure to be compared with the target hydraulic pressure, a maximum value of the actual hydraulic pressure (=actual line pressure) is used.

At step S25, subsequent to the determination that actual hydraulic pressure>target hydraulic pressure at step S24, AT controller 7 calculates a difference pressure $\Delta P1$ (=actual line hydraulic pressure), determines difference pressure $\Delta P1$ which is the calculation result (=actual hydraulic pressure−target hydraulic pressure), and the routine is ended.

At step S26, subsequent to the determination that actual hydraulic pressure≤target hydraulic pressure at step S24, AT controller 7 feeds back the line pressure command such that the actual hydraulic pressure≤target hydraulic pressure, feeds back that actual hydraulic pressure≤target hydraulic pressure, a command value of the line pressure command is wholly raised by the learning value, and the routine is ended.

It should be noted that a learning quantity (the learning value) when the actual line pressure is lower than a target line pressure may be a command value rise width predetermined in spite of the difference pressure or may be the command value rise width in accordance with the difference pressure between the target hydraulic pressure and the actual hydraulic pressure.

[Second Learning Value Calculation Processing Structure in the Line Pressure Control]

Figure 8:
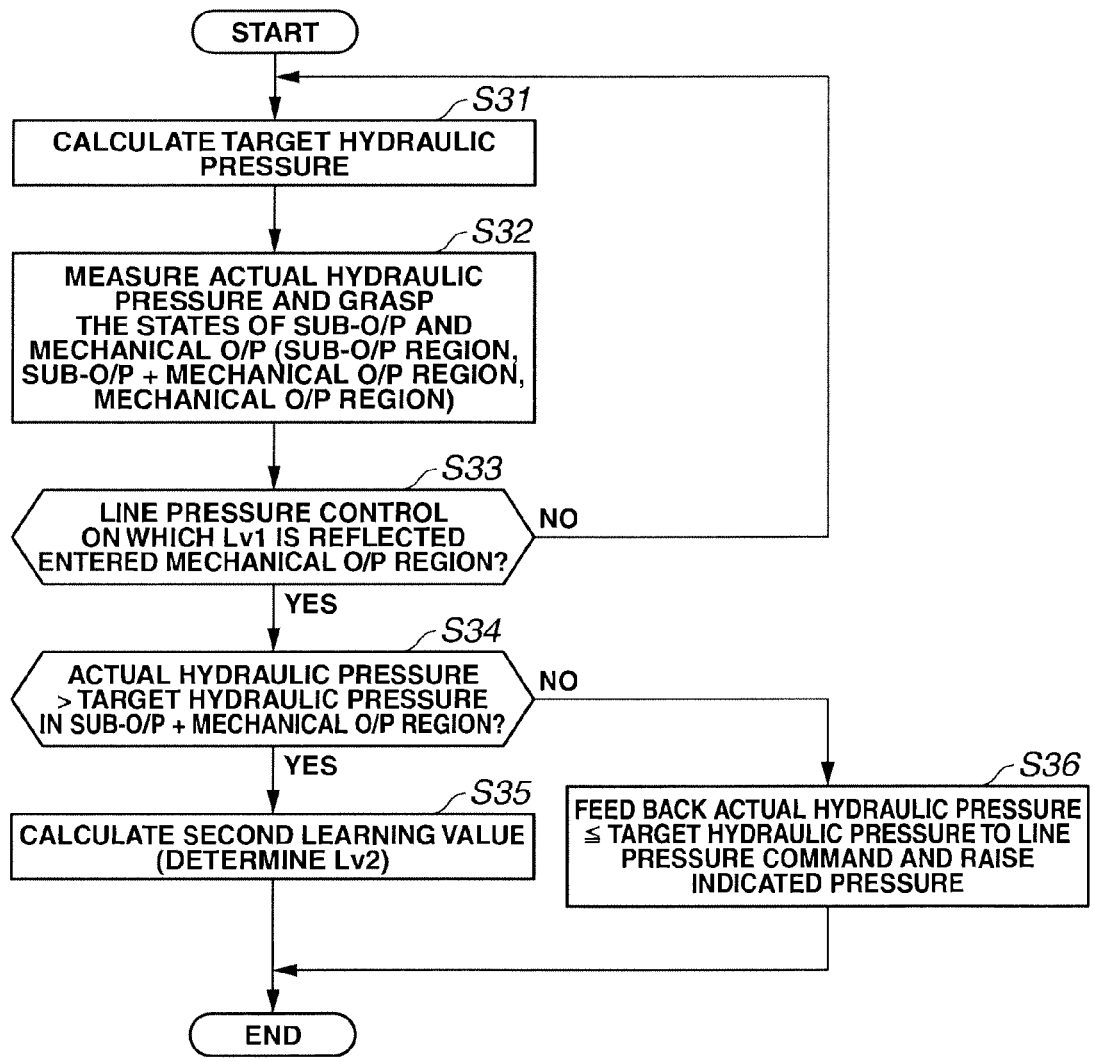
FIG. 8 is a flowchart representing a flow of a second learning value calculating processing executed by the AT controller in the embodiment shown in FIG. 1.

FIG. 8 represents a flowchart of the second learning value calculation processing executed by AT controller 7 (a learning value calculation section) in this embodiment. First, each step shown in FIG. 8 representing the calculation processing of second learning value Lv2 in the line pressure control will be explained. It should be noted that the second learning value calculation processing shown in FIG. 8 is started when the indicated pressure reduction width (=first learning value Lv1) from the initial stage indicated pressure in the first region (in first region (a), only sub-O/P is the hydraulic pressure source) is reduced with first learning value Lv1 as a indicated pressure reduction width at the first region and the line pressure control using the line pressure command to hold the reduced indicated pressure at the second region (in the second region (b), both of sub-O/P and mechanical O/P are the hydraulic pressure sources) is performed.

At a step S31, subsequent to the start of routine in FIG. 8 or subsequent to the determination that it is the time before entry of mechanical O/P region at a step S33, AT controller 7 calculates the target hydraulic pressure (=target line pressure) according to the maximum pressure from among respective required hydraulic pressures in a plurality of hydraulic pressure engagement frictional elements installed in the system in the same way as step S21 and the routine goes to a step S32. carries out the measurement of the actual hydraulic pressure by means of line pressure sensor 29 in the same way as step S22, performs the state grasping of mechanical oil pump M-O/P and electrically driven oil pump S-O/P, and the routine goes to a step S33.

At a step S32, subsequent to the calculation of the target hydraulic pressure at step S31 or subsequent to the determination that the region enters mechanical O/P region at step S33, AT controller 7 measures the actual hydraulic pressure by means of line pressure sensor 29, performs the state grasping of mechanical O/P and electrically driven oil pump (Sub-O/P), in the same way as step S22, and the routine goes to a step S33.

At step S33, subsequent to the measurement of the actual hydraulic pressure at step S32 and the state grasping of sub-O/P and mechanical O/P at step S32, AT controller 7 determines whether the line pressure control on which first learning value Lv1 is reflected enters from sub-O/P+mechanical O/P region to the mechanical O/P region. If Yes (enter into mechanical O/P), the routine goes to a step S34. If NO (before the enter of mechanical O/P region), the routine returns to step S32.

At step S34, subsequent to the determination that the region has entered the mechanical O/P region at step S33, AT controller 7 determines whether actual hydraulic pressure>target hydraulic pressure in the sub OP+mecha OP region in the same way as step S24 and if NO (Actual hydraulic pressure. If Yes (actual hydraulic pressure>target hydraulic pressure), the routine goes to a step S35. If No (actual hydraulic pressure≤target hydraulic pressure), the routine goes to a step S36.

At step S35, subsequent to the determination that the actual hydraulic pressure>target hydraulic pressure at step S34, AT controller 7 calculates a difference pressure ΔP2 (=actual hydraulic pressure−target hydraulic pressure) and determines difference pressure ΔP2 which is the calculation result as second learning value Lv2 and the routine is ended.

At step S36, subsequent to the determination that actual hydraulic pressure≤target hydraulic pressure at step S34, At controller 7 feeds back actual hydraulic pressure≤target hydraulic pressure to the line pressure command in the same way as step S26 and raises wholly the command value of the line pressure command by the learning quantity and the routine goes to the end.

Next, an action of the line pressure control apparatus for the vehicle in this embodiment will be explained.

First, a task of a comparative example will be explained. Subsequently, the actions of the line pressure control apparatus for the vehicle in the preferred embodiment will be explained by dividing the actions into to "line pressure control action at the time of transition of the hydraulic pressure source" and "learning value calculation action in the line pressure control".

[Task of the Comparative Example]

Figure 9:
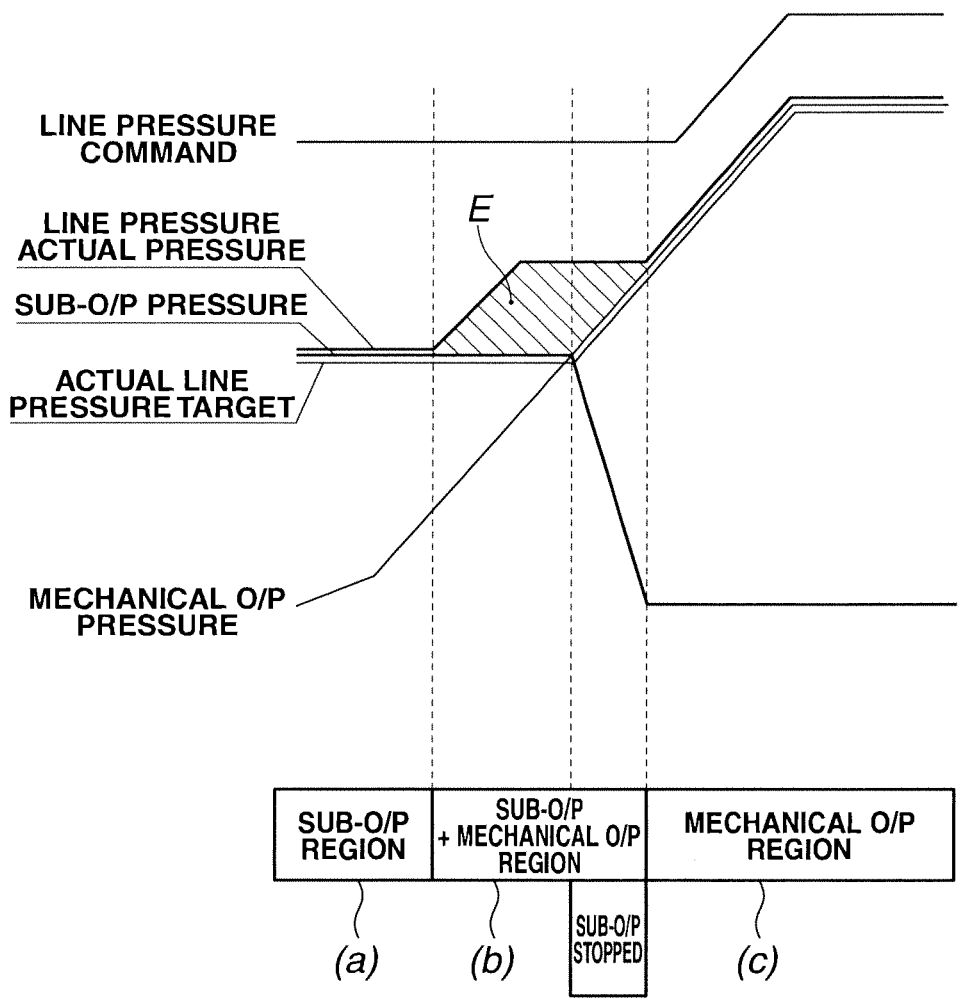
FIG. 9 is a timing chart representing each characteristic of a line pressure command, a line pressure actual pressure, sub OP pressure (an electrically driven oil pump pressure), an actual line pressure target, and a mechanical OP (oil pump) pressure in the line pressure control carried out when a hydraulic pressure source is transferred from the electrically driven oil pump to the mechanical oil pump in a case of a first comparative example to the preferred embodiment according to the present invention.

As the hydraulic pressure sources, the mechanical O/P and electrically driven oil pump (sub-O/P) are respectively connected in parallel to each other. At the time of the vehicle start, the hydraulic pressure sources are transitioned from electrically driven oil pump (first region (a))→electrically driven oil pump (sub-O/P)+mechanical oil pump (second region (b)) →mechanically oil pump (third region (c)). At this time, even if the hydraulic pressure source is transitioned from the first region (a) to second region (b) in which both of electrically driven oil pump and mechanically driven oil pump are operated, the line pressure command when only the electrically driven oil pump is operated in the first region (a) is maintained (as it is) is assumed as a comparative example 1 (FIG. 9). In details, FIG. 9 shows a timing chart representing each characteristic of line pressure command, line pressure actual pressure, sub-O/P (electrically driven oil pump) pressure, actual line pressure target, and mechanical O/P (mechanical oil pump) pressure under the line pressure control carried out when the hydraulic pressure sources are transferred (transitioned) from the electrically driven oil pump region (a) to the mechanical oil pump region (c) in the comparative example 1.

First, since the electrically operated motor adopts the torque control method which controls constantly an output shaft torque of the electrically operated motor during the operation of the electrically driven oil pump, the revolution speed of the electrically operated motor is not raised even if an indicated hydraulic pressure is made high to according to the line pressure command during the operation of only the electrically driven oil pump (sub-O/P). Hence, the pressure equal to or higher than the required pressure is not discharged from sub-O/P. Thus, in first region (a) in which only the electrically driven oil pump is operated, the indicated hydraulic pressure is made higher than the actual line pressure target to achieve a securing of a response characteristic of the actual hydraulic pressure and the prevention of the insufficient hydraulic pressure at a time of transition from the electrically driven oil pump (region) to the mechanical oil pump (region) as shown in the line pressure command characteristic at first region (a) in FIG. 9.

However, in a case of comparative example 1, even if the state region is transferred (transitioned) to second region (b) in which both of the electrically driven oil pump and the mechanical oil pump are operated together, the line pressure command is held at the same height as that in the case of first region (a) as shown in FIG. 9. Therefore, as shown in the line pressure actual pressure characteristic shown in FIG. 9, according to the pump discharge pressure (a synthesized pressure is with a relief valve pressure as an upper limit pressure), the line actual pressure is made higher than the actual line pressure target (=required pressure).

Therefore, in the case of comparative example 1, when a hatching region denoted by E in FIG. 9 indicates a wasteful line pressure extra mount to the actual line pressure target (=required pressure). Consequently, a wasteful line pressure extra amount to the actual line pressure target (=required pressure) is resulted and a fuel consumption (fuel economy) performance is reduced.

From the viewpoint of an importance placed on the fuel consumption (fuel economy), when the state is transferred (transitioned) from first region (a) in which only the electrically driven oil pump is activated (operated) to second region (b) in which both of the electrically driven oil pump and the mechanically driven oil pump are operated, the line pressure is actively reduced as in another comparative example 2.

Figure 10:
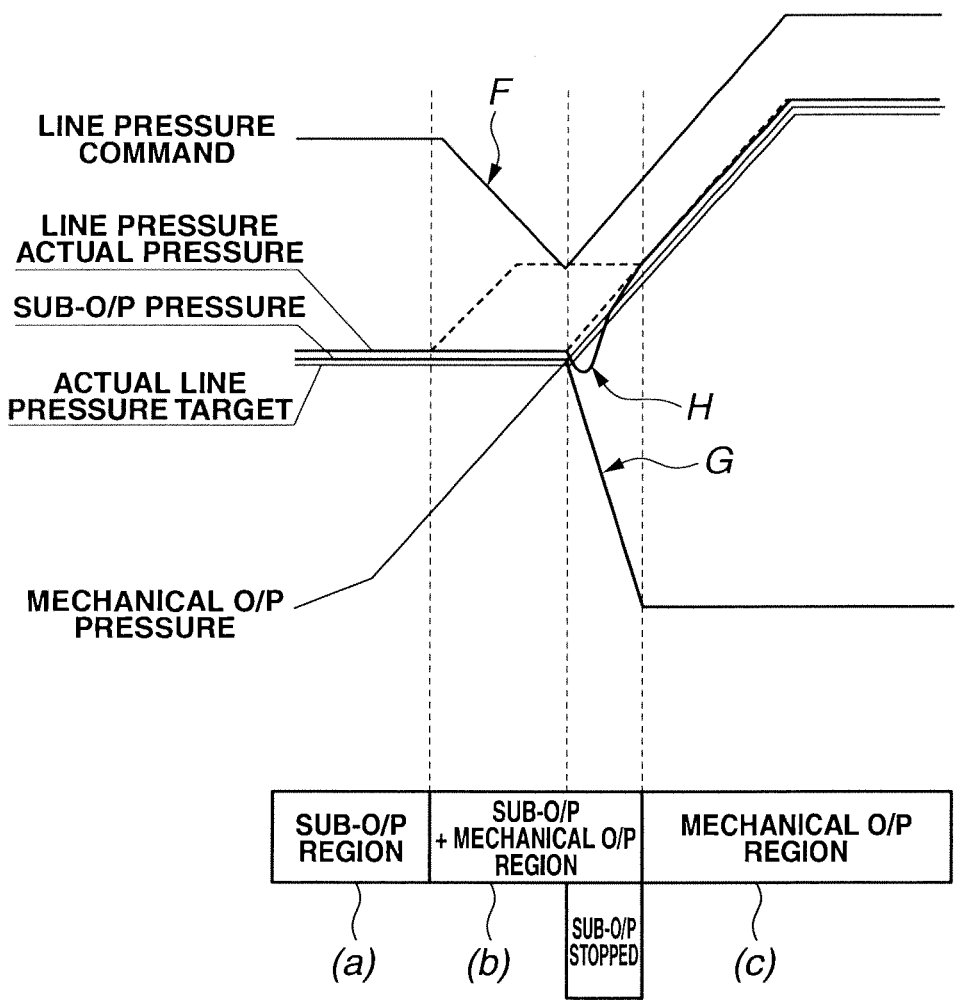
FIG. 10 is a timing chart representing each characteristic of the line pressure command, the line pressure actual pressure, the sub OP pressure (the electrically driven oil pump pressure), the actual line pressure target, and the mechanical OP (oil pump) pressure in the line pressure control carried out, in a case of the preferred embodiment when a CL2 slip control is intervened while the hydraulic pressure source is transferred from the electrically driven oil pump to the mechanical oil pump.

In the case of comparative example 2, when only the electrically driven oil pump is abruptly stopped in a state in which the indicated pressure is decreased (F in FIG. 10) in the downward direction with the line pressure command reduced in second region (b) (G in FIG. 10). In this way, when the line pressure is in the state of second region (b) such that the line pressure is under an undershoot, the clutch disposed on the drive system (hybrid drive train) is subject to execute a clutch slip control such that the clutch is slip engaged. At this time, a variation in the slip engagement hydraulic pressure to the clutch is induced. As a result, the clutch engagement hydraulic pressure such that a capacity control is performed to maintain the slip state is varied so that the above-described judder (a kind of hydraulic pressure vibration) often occurs.

As described above, two kinds of pumps whose pump characteristics are different are provided as the hydraulic pressure sources and, in the line pressure control when the hydraulic pressure sources are transferred (transitioned) from the electrically driven oil pump (region) to the mechanical oil pump (region), it is a required performance to obtain the fuel economy advantage not only the judder prevention during the slip control of the clutch of the drive train and a task to be solved is to achieve a compatibility between the improvement in the fuel economy performance and judder prevention.

Especially, since, in the hybrid vehicle having one-motor-and-two-clutch drive train, at a time of the vehicle start with the HEV mode selected, in the vehicle stop state or in a vehicle start area in both of which the discharge pressure from the mechanical oil pump (M-O/P) becomes insufficient, such a situation that, with the electrically driven oil pump as the hydraulic pressure source, the hydraulic pressure source is transferred (transitioned) to the mechanical oil pump occurs after the passage of the vehicle start area. Then, at the time of the vehicle state during the selection of HEV mode, the selection of "WSC mode" in which second clutch CL2 is slip engaged is made so that CL2 slip control is executed at the time of transition of the hydraulic pressure source. It should be noted that, even at the time of the vehicle start of the selection of "EV mode", the transition of the hydraulic pressure source is, similarly, developed but a perfect engagement of second clutch CL2 is maintained, since only motor•generator MG which is capable of raising the revolution speed from zero speed provides the traveling drive source. Thus and the CL2 slip control becomes unnecessary.

[Line Pressure Control Action at the Time of the Hydraulic Pressure Source Transition]

Upon an analysis of a situation such as to encircle the line pressure control at the time of the hydraulic pressure transition, a contrivance such that how the line pressure command is given is needed. Hereinafter, the line pressure control action at the time of the transition of the hydraulic pressure source on which the above-described contrivance is reflected will, hereinafter, be explained.

First, on a basis of the flowchart in FIG. 6, the action of the line pressure control processing will be explained below.

In a case where only the electrically driven oil pump is not the hydraulic pressure source, the flow of step S1→step S2→step S15→end is repeated. That is to say, an ordinary control such that the line pressure command is outputted according to the indicated pressure along the target line pressure is executed.

When a state in which only electrically driven oil pump sub-O/P is the hydraulic pressure source has been reached, in the flowchart of FIG. 6, such a route as step S1→step S2→step S3→step S4 is advanced. While the discharge pressure from mechanical O/P cannot be confirmed (not discharged), the flow of step S3→step S4 is repeated. That is to say, the initial stage indicated pressure (constant pressure indication (or instruction)) preset to be higher than the required pressure is outputted.

Then, when only electrically driven oil pump sub-O/P is the hydraulic pressure source and, when the discharge pressure of M-O/P can be confirmed, the routine goes to step S4 from step S3 and this flow is repeated. That is to say, at step S6, the line pressure command for the initial stage indicated pressure preset to be higher than the required pressure (constant pressure indication) which is reduced by first learning value Lv1 is outputted. The output of the line pressure command which reduces the indicated pressure is continued until the reduction of the indicated pressure by first learning value Lv1 is determined to be completed (thereafter, the indicated pressure is held) or until both of electrically driven oil pump Sub-O/P and mechanical oil pump M-O/P are determined to be the hydraulic pressure sources.

Next, when both of electrically driven oil pump Sub-O/P and mechanical oil pump M-O/P are determined to be the hydraulic pressure sources at step S8, the routine shown in FIG. 6 goes to step S9 in which AT controller 7 determines whether CL2 slip control is executed. The flow of FIG. 6 is divided depending upon whether CL2 slip control is executed or whether CL2 slip control is not executed. In a case of CL2 slip control execution, the routine goes from step S9→step S10→step S14 and until the determination that only mechanical O/P at step S14 is the hydraulic pressure source, the flow of step S9→step S10→step S14 is repeated. That is to say, at step S10, the line pressure command to hold the indicated pressure at a final time point (a first learning point) at which only electrically driven oil pump sub-O/P is the hydraulic pressure source.

On the other hand, in the case of non-execution of CL2 slip control, the routine shown in FIG. 6 goes from step S9 to step S11→step S11→step S12→step S14 until AT controller 7 determines that only mechanical oil pump M-O/P is the hydraulic pressure source at step S14. That is to say, at step S12, AT controller 7 outputs the line pressure command to reduce the indicated hydraulic pressure at the first learning point by second learning value Lv2. The output of the line pressure command to reduce this indicated hydraulic pressure is continued until AT controller 7 determines that the reduction of the indicated pressure by second learning value Lv2 has been completed at step S11 (thereafter, hold the indicated pressure) or until AT controller 7 determines that only mechanical O/P provides the hydraulic pressure source at step S14. It should be noted that, if, in a midway through the flow of step 9→step S11→step S14 is repeated, AT controller 7 determines that the CL2 slip control is being executed at step S9, the routine in FIG. 6 is advanced as step S10→step S14 from step S9 and AT controller 7 switches to the output of the line pressure command to hold the indicated pressure.

Next, if AT controller 7 determines that only mechanical OP (M-O/P) is the hydraulic pressure source, the routine goes from step S14 to end via step S15 to execute the ordinary control such as to output the line pressure command according to the indicated pressure along with the target line pressure.

It should be noted that the aim of the line pressure control (basic control) without CL2 slip control intervention or without non-intervention of CL2 slip control in the preferred embodiment will be explained.

The line pressure control in the preferred embodiment grasps first region (a) in which the hydraulic pressure source is only electrically driven oil pump (Sub-O/P), second region (b) in which both of electrically driven oil pump (Sub-O/P) and mechanically driven oil pump (M-O/P) are the hydraulic pressure sources, and third region (c) in which only mechanically driven oil pump (M-O/P) is the hydraulic pressure source. Then, the line pressure control in the preferred embodiment has a feature that, for each of first, second, and third regions (a), (b), and (c), the functions to be demanded are shared.

That is to say, as far as the improvement in the fuel economy performance is concerned, a share is carried out in first region (a).
Measures of the improvement in the fuel economy performance are taken to perform the reduction of the initial stage indicated pressure preset to be higher than the required pressure in first region (a) toward the required indicated pressure which secures the required pressure in first region (a). Therefore, in first region (a), as compared with a comparative case where the initial stage indicated pressure preset to be higher than the required pressure in first region (a) is maintained as it is, the improvement in the fuel economy can be achieved.

Then, as far as the prevention of the judder due to the interference between the line pressure control and the CL2 slip control is concerned, this prevention is shared in second region (b) and measures of the prevention of the judder are taken to hold the indicated pressure at a value at the time point of the end of first region (a). Therefore, it is not necessary to monitor whether the CL2 slip control is being executed or not. Thus, the hydraulic pressure variation to second clutch CL2 generated when the reduction in the indicated pressure in second region (b) is continued is suppressed and the generation of the judder can be prevented.

Hence, according to the line pressure control (basic control) in the preferred embodiment, when the hydraulic pressure source is transferred (transitioned) from electrically driven oil pump (Sub-O/P) (region) to mechanically driven oil pump (M-O/P) (region), the compatibility between the improvement in the fuel economy and the prevention of judder can be achieved.

Next, an aim of the line pressure control with the intervention and non-intervention of the CL2 slip control in the preferred embodiment will be described below.

The line pressure control with the intervention or non-intervention of the CL2 slip control in the preferred embodiment takes a higher priority of the prevention of generation of the judder (FIG. 11) by holding the indicated pressure at second region (b) for the execution of the CL2 slip control and takes a higher priority of the improvement in the fuel economy (FIG. 12) by reducing the indicated pressure even at second region (b) to the CL2 slip control non-execution (non-intervention of CL2 slip control).

Figure 11:
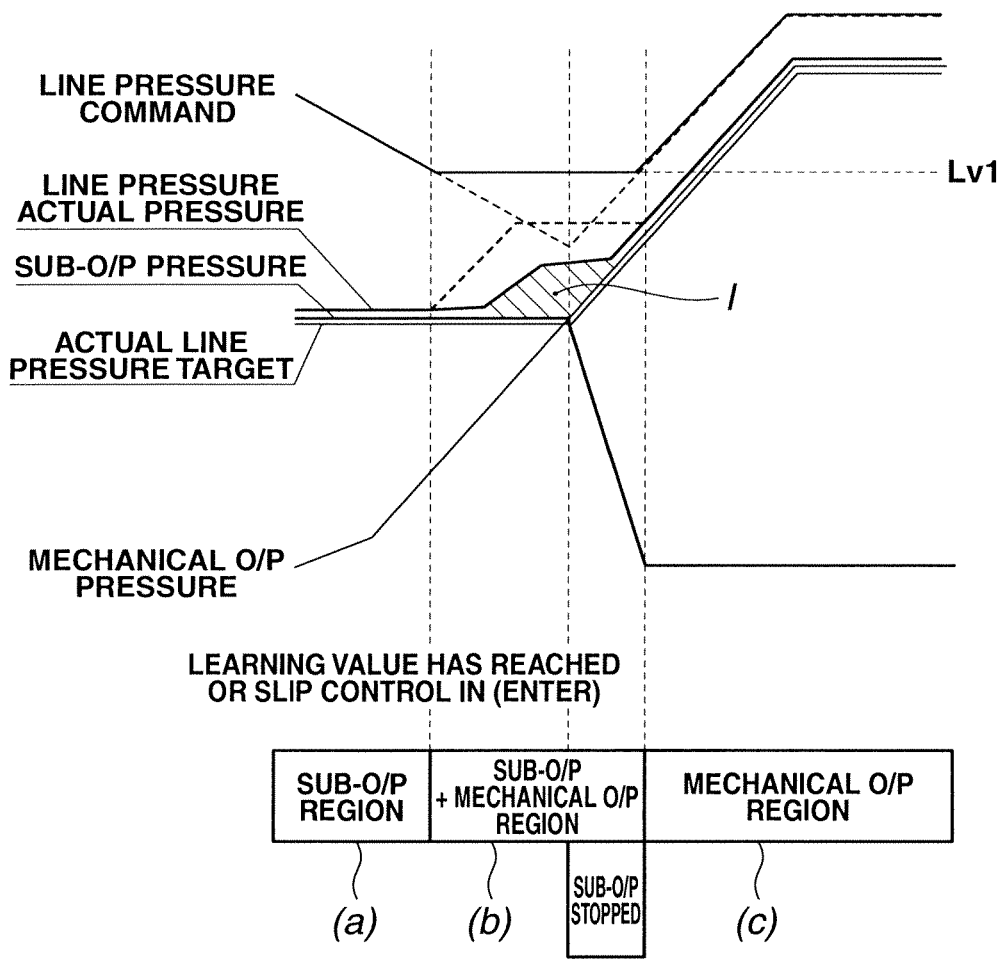
FIG. 11 is a timing chart representing each characteristic of the line pressure command, the line pressure actual pressure, the sub OP pressure (the electrically driven oil pump pressure), the actual line pressure target, and the mechanical OP (oil pump) pressure in the line pressure control carried out in the case of the preferred embodiment when the hydraulic pressure source is transferred from the electrically driven oil pump to the mechanical oil pump.

That is to say, when the CL2 slip control is being executed while the transition of the hydraulic pressure source, it is necessary to prevent the occurrence of judder. Hence, as shown in FIG. 11, when the region is transferred (transitioned) from first region (a) to second region (b), the indicated pressure is held at the indicated pressure at the time point of the end of first region (a) when CL2 slip control flag is already raised (set to "1"). In addition, even when the region falls in second region (b) while the CL2 slip control flag is not raised (reset to "0"), the line pressure control is executed such that the reduction in the indicated pressure is continued up to a time point at which the CL2 slip control flag is set to "1" and the indicated pressure is held at the indicated pressure at a time point at which the CL2 slip control flag is raised to "1". Therefore, at second region (b), with the confirmation of the state of CL2 slip control flag as a condition, the line pressure control serves to control to hold the indicated pressure. Thus, a hydraulic pressure variation to second clutch CL2 is suppressed. Even if the CL2 slip control is executed during the transfer of the hydraulic pressure source, the generation of judder is assured.

Figure 12:
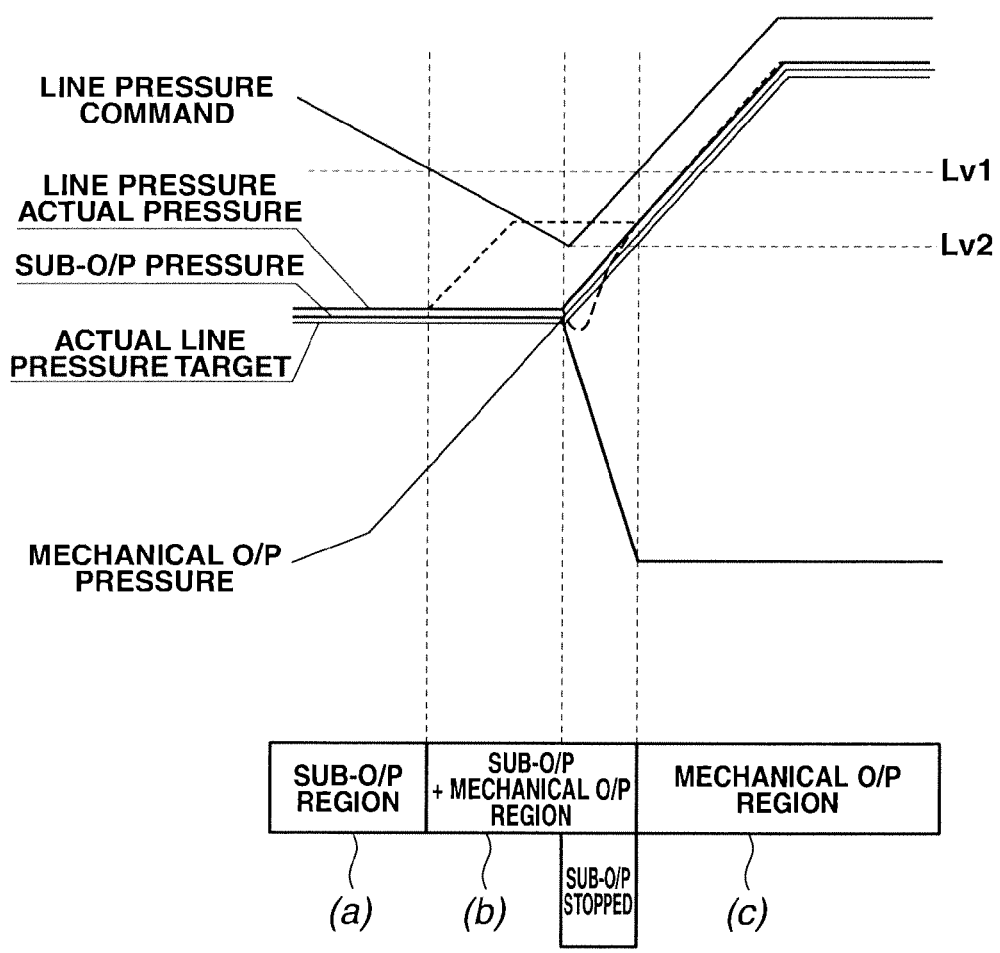
FIG. 12 is a timing chart representing each characteristic of a line pressure command, the sub OP pressure, an actual line pressure target, and the mechanical OP pressure in the line pressure control carried out in the case of the preferred embodiment when a hydraulic pressure source is transferred from an electrically operated motor to a mechanical oil pump and a CL2 slip control is not intervened in the preferred embodiment.

On the other hand, it is not necessary to prevent the occurrence of the judder while the CL2 slip control is not executed while the hydraulic pressure source is being transferred (transitioned). Hence, in place of the indicated pressure holding control in second region (b), the further reduction of the indicated pressure toward the limit region of the required hydraulic pressure at which the required pressure is secured at second region (b) is carried out. For example, when the indicated pressure holding control at second region (b) is carried out even when the CL2 slip control is not executed, an extra amount of the line pressure (a hatching region denoted by I of FIG. 11) is outputted. Whereas, when the CL2 slip control is not being executed, the indicated pressure is, furthermore, reduced toward the limitation region of the required hydraulic pressure at which the required pressure is secured at second region (b) is achieved so that it becomes possible to obtain the characteristic such that no extra amount of line pressure along with actual line pressure target as shown in FIG. 12 becomes possible and the fuel economy performance can be raised to the maximum performance region.

In addition, even if the CL2 slip control is executed after the reduction of the indicated pressure to second learning value Lv2, such a control that the line pressure is reduced by second learning value Lv2 or more is not executed so that the generation of judder is suppressed and the fuel economy performance is improved to the maximum performance region.

[Learning Value Calculation Action in the Line Pressure Control]

A line pressure control system, method, or the like cannot avoid a variance in a performance that a unit (individual components of the hydraulic pressure control apparatus) naturally has.

Hence, such a line pressure control as to reduce the indicated pressure is carried out so that a reduction width of the indicated pressure with this variance taken into consideration is given by a small fixed value. At this time, the fuel economy performance is suppressed. Hence, while the variance of the characteristic of the unit that naturally has is absorbed, such a contrivance that the reduction width of the indicated pressure as large as possible is needed. Hereinafter, the explanation of the learning value calculation processing will be made in the line pressure control on which the above-described point is reflected.

First, the action of the calculation processing of first learning value Lv1 will be explained with reference to a flowchart in FIG. 7.

For example, the flowchart in FIG. 7 is started when the line pressure control to hold the line pressure command obtaining an initial stage indicated pressure preset to be higher than the required pressure is carried out at first region (a) and at second region (b). The flow in the flowchart in FIG. 7 advanced as step S21→step S22→step S23 is repeated until the region (the state) enters third region (c) in which only the mechanical oil pump (mechanical O/P) is the hydraulic pressure source. Then, at third region (c), AT controller 7 determines whether actual hydraulic pressure>target hydraulic pressure at step S24 on a basis of the retrieved data (the target hydraulic pressure, the actual hydraulic pressure, and so forth). If actual hydraulic pressure>target hydraulic pressure at step S24 is determined, the routine goes to step S25. At step S25, AT controller 7 decides a maximum difference pressure (actual hydraulic pressure−target hydraulic pressure=difference pressure ΔP1 as a first learning value. ΔP1 is determined as the actual hydraulic pressure. In addition, if actual hydraulic pressure≤target hydraulic pressure at step S24, the routine goes to step S26 in which the fact that actual hydraulic pressure≤target hydraulic pressure is fed back to increase the indicated pressure. It should, herein, be noted that difference pressure ΔP1 is the maximum hydraulic pressure reduction width to which the target hydraulic pressure is securable. Since the reduction width reflects the variance of the characteristic of the unit that naturally has, this is determined as first learning value Lv1.

Next, the action of calculation processing of second learning value Lv2 will be explained on a basis of a flowchart in FIG. 8.

For example, after deciding first learning value Lv1, the target hydraulic pressure at first region (a) is reduced from the initial stage indicated pressure to first learning value Lv1 and the line pressure control by means of the line pressure command to hold the indicated pressure reduced at second region (b) is carried out. At this time, the calculation of second learning value Lv2 is started. Then, in the flowchart in FIG. 8, the flow of advancing as step S31→step S32→step S33 is repeated up to the entrance of third region (c) in which only the mechanical oil pump is the hydraulic pressure source. Then, when the region enters third region (c), AT controller 7 determines whether actual hydraulic pressure>target hydraulic pressure at step S34. If actual hydraulic pressure>target hydraulic pressure, the routine goes to a step S35 to determine that actual hydraulic pressure−target hydraulic pressure=difference pressure ΔP2 (maximum difference pressure) as second learning value Lv2. In addition, actual hydraulic pressure≤target hydraulic pressure at step S34 and the routine goes to step S36. At step S36, AT controller 7 feedbacks actual hydraulic pressure≤target hydraulic pressure to the line pressure command to increase the indicated pressure. It should be noted that difference pressure ΔP2 is the maximum hydraulic pressure reduction width to which the target hydraulic pressure is securable at second region (b) and its value reflects the variance of the characteristic of the unit that naturally has, and this is decided as second learning value Lv2.

An aim of the above-described learning is to absorb the variance of the characteristic of the unit in accordance with the state of the hydraulic pressure source (a torque variance in electrically driven oil pump Sub-O/P itself, the variance of pressure regulator valve 24, and the variance of other control valves), to suppress the variance of the actual line pressure irrespective of the variance of the characteristics of the unit that naturally has and to achieve a stable line pressure PL by pressure regulating using the learning value.

As a result of this learning, the unit differences are eliminated in parts due to the line pressure as far as the fuel economy is concerned in accordance with the state of the hydraulic pressure source. In addition, by pressure regulating using the result of learning, the actual line pressure can be dropped to a height with respect to the required pressure as low as possible. Hence, the actual line pressure can be controlled to a useless state (excessively high line pressure that is required) from the viewpoint of the fuel economy. Hereinafter, on a basis of FIGS. 13 through 20, the calculation action of first learning value Lv1 and second learning value Lv2 will be explained.

(Calculation Action of First Learning Value Lv1)

Figure 13:
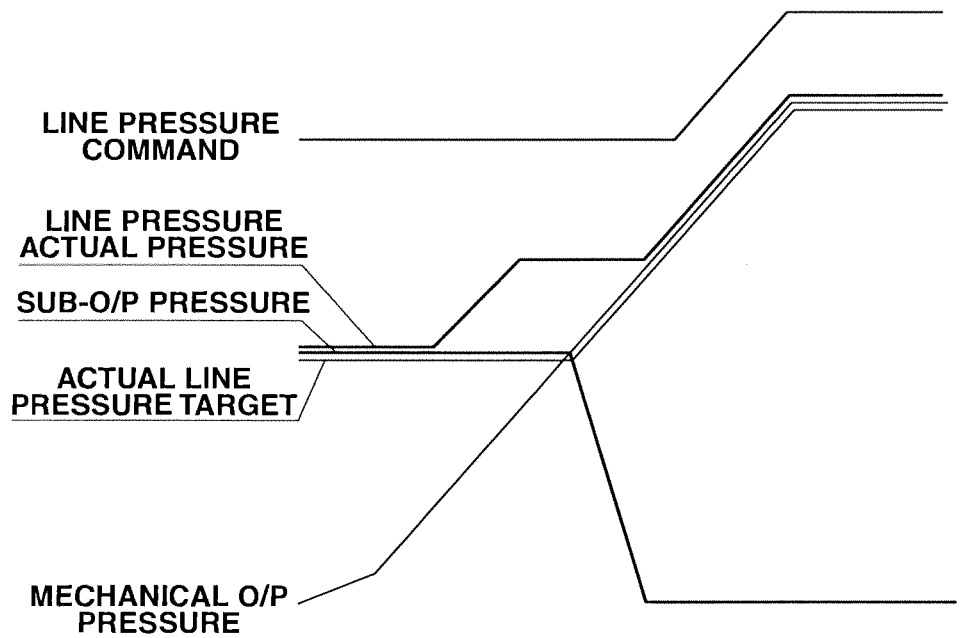
FIG. 13 is a timing chart representing each characteristic for explaining a first learning value calculation processing (an initial state) in the line pressure control carried out when the hydraulic pressure source is transferred from the electrically driven oil pump to the mechanical oil pump in the preferred embodiment.
Figure 13:
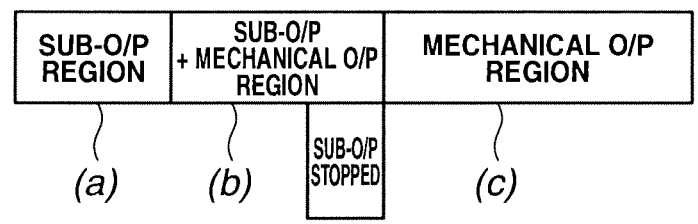
Figure 14:
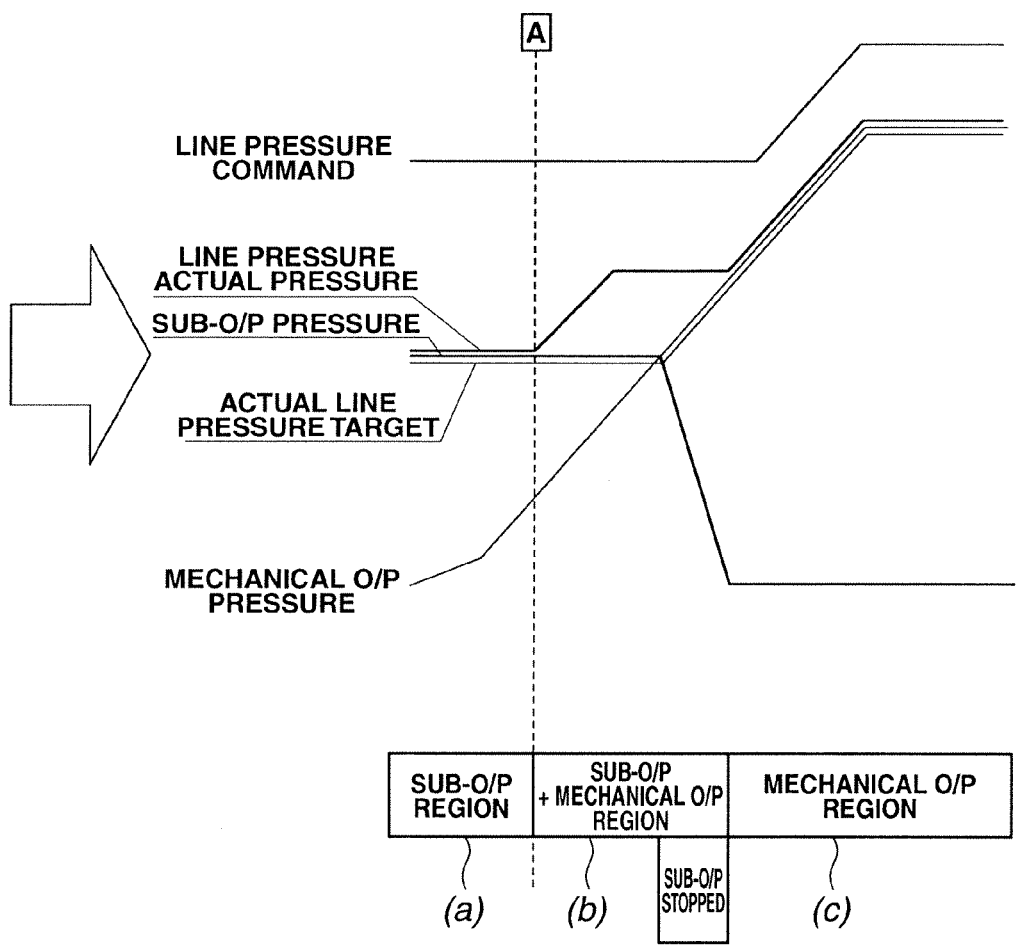
FIG. 14 is a timing chart representing each characteristic for explaining the first learning value calculation procedure (point A detection) in the line pressure control carried out when the hydraulic pressure source is transferred from the electrically driven oil pump to the mechanical oil pump in the preferred embodiment.

(1) The line pressure command is set to a state in which the indicated pressure is high at first region (a) and at second region (b) (FIG. 13).

(2) Point A is detected when mechanical O/P pressure is raised and the hydraulic pressure source is raised so that the actual line pressure (line pressure actual pressure) after the hydraulic pressure source falls in second region (b) which is sub-O/P+mechanical O/P is in excess of the target pressure (actual line pressure target (FIG. 14)).

Figure 15:
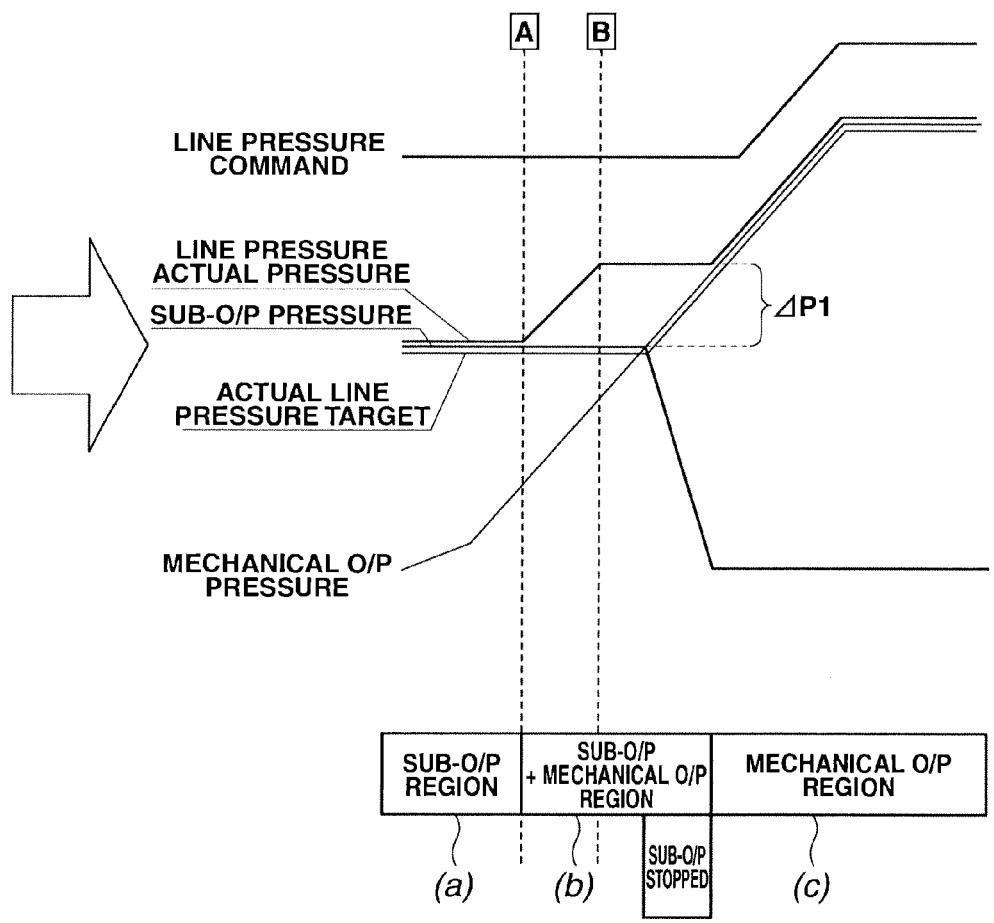
FIG. 15 is a timing chart representing each characteristic for explaining the first learning value calculation procedure (detections of a point B and a difference ΔP1) in the line pressure control carried out when the hydraulic pressure source is transferred from the electrically operated oil pump to the mechanical oil pump in the preferred embodiment.

(3) Point B is detected at which the difference between the actual line pressure (line pressure actual pressure) and the target pressure (actual line pressure target) at second region (b) in which the hydraulic pressure source is sub-O/P+mechanical O/P provides maximum and its difference ΔP1 is detected (FIG. 15).

Figure 16:
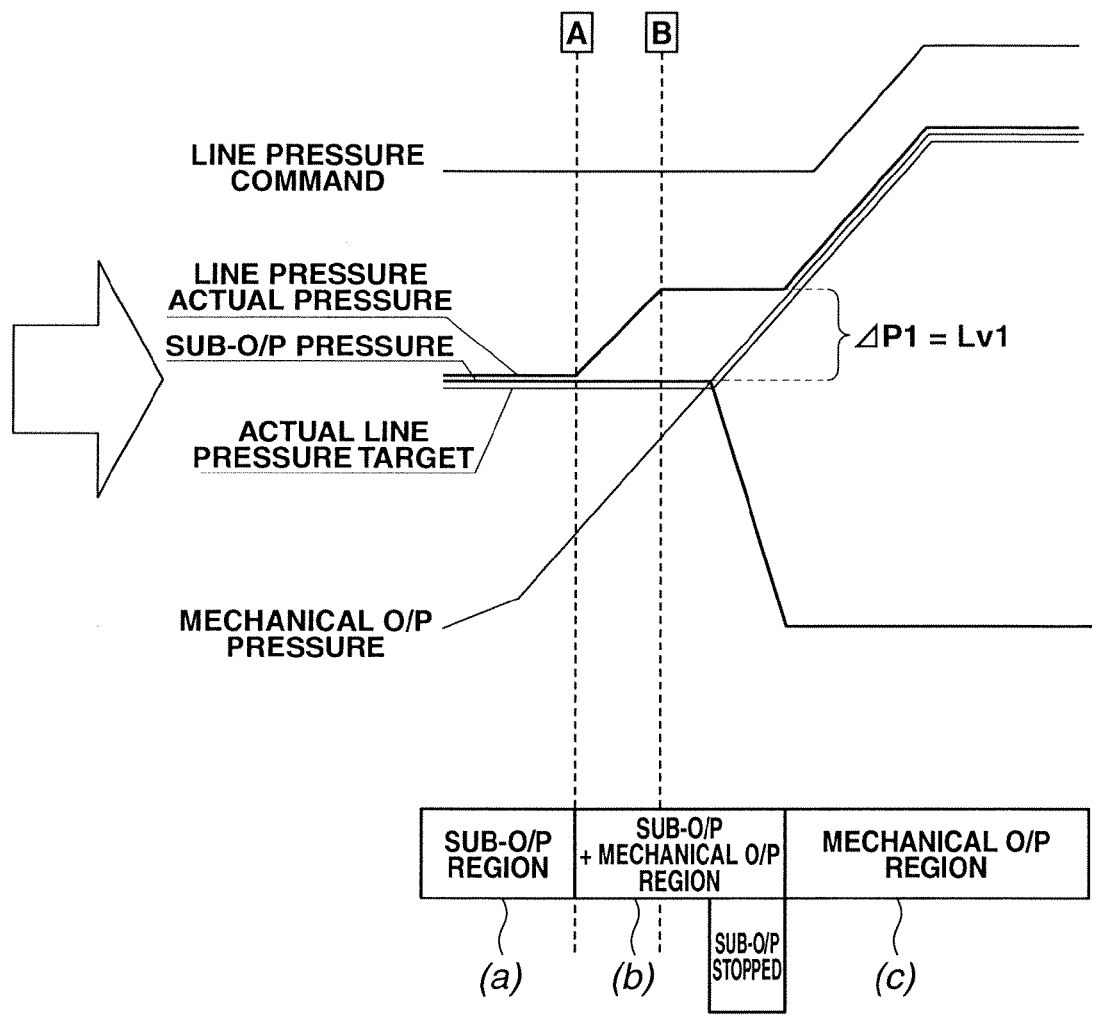
FIG. 16 is a timing chart representing each characteristic for explaining the first learning value calculation procedure (a storage of first learning value Lv1) in the line pressure control carried out when the hydraulic pressure source is transferred from the electrically operated oil pump to the mechanical oil pump in the preferred embodiment.

(4) Store difference pressure ΔP1 detected at second region (b) ([sub-O/P pressure+actual line pressure of mechanical O/P]−target pressure) as first learning value Lv1 (FIG. 16).

(Calculation Action of Second Learning Value Lv2)

Figure 17:
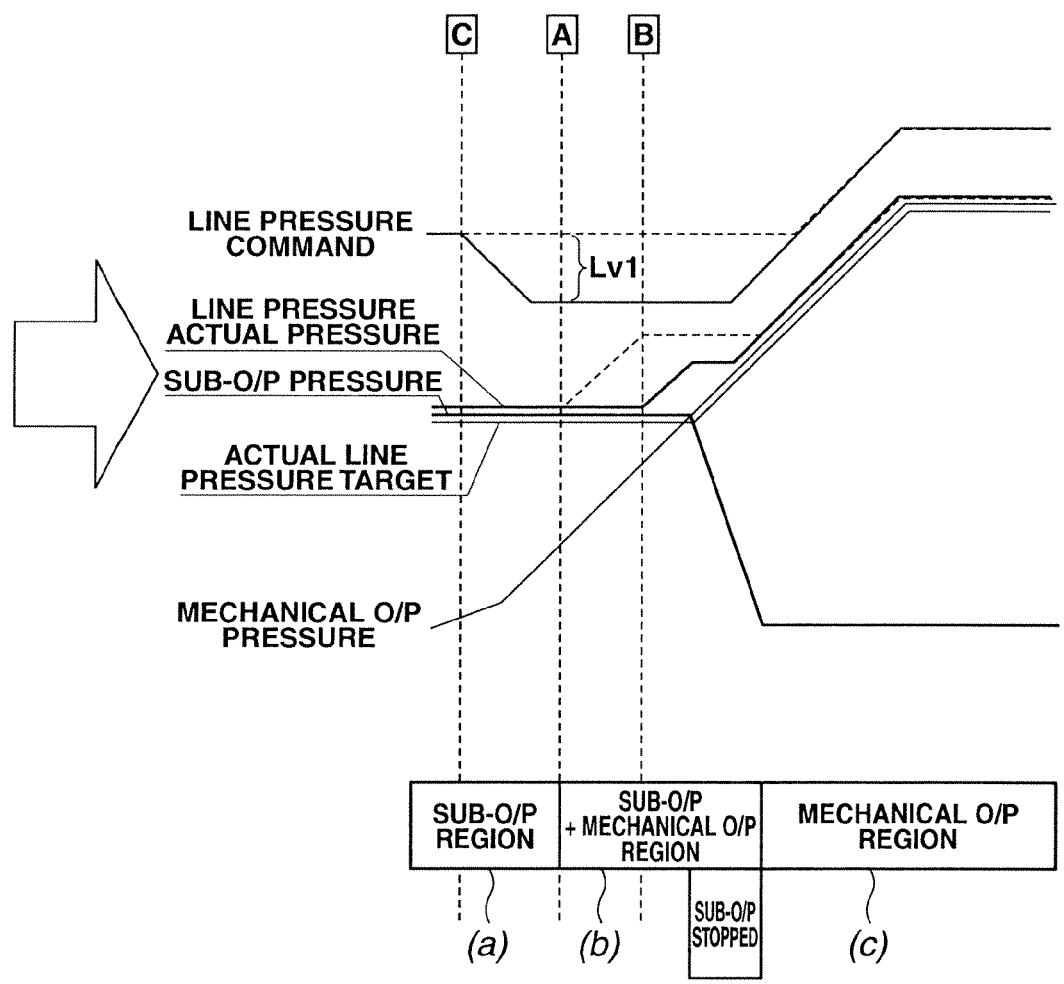
FIG. 17 is a timing chart representing each characteristic for explaining a second learning value calculation procedure (a reduction of first learning value Lv1 from a point C) in the line pressure control carried out when the hydraulic pressure source is transferred from the electrically operated oil pump to the mechanical oil pump in the preferred embodiment.

(5) The line pressure command is gradually reduced by first learning value Lv1 when an input revolution speed is equal to or higher than a certain revolution speed (a point C (C) in FIG. 17 at which the hydraulic pressure of mechanical O/P (mechanical oil pump) is started to be caused to flow) at a time of the next start of the vehicle (FIG. 17).

Figure 18:
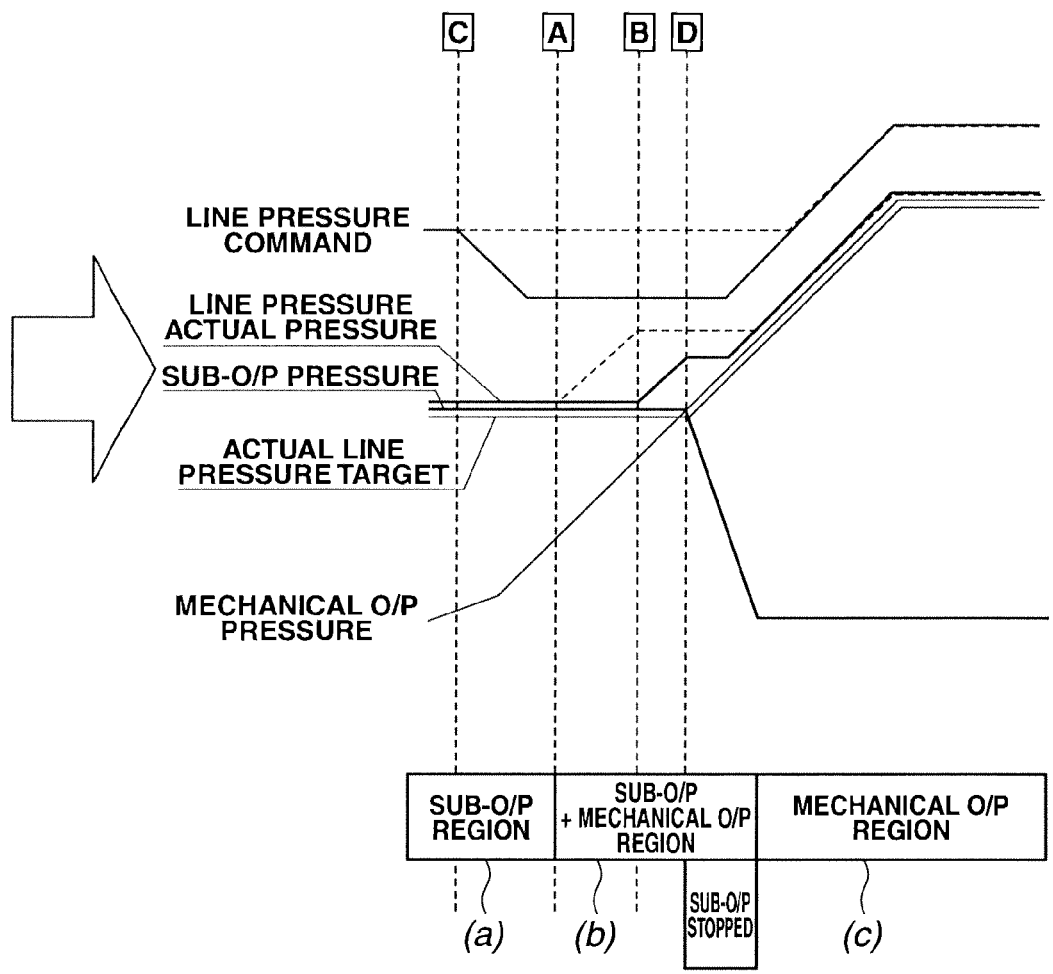
FIG. 18 is a timing chart representing each characteristic for explaining a second learning value calculation procedure (a detection of a point D) in the line pressure control carried out when the hydraulic pressure source is transferred from the electrically operated oil pump to the mechanical oil pump in the preferred embodiment.

(6) If the control such that the line pressure command is gradually reduced by first learning value Lv1 is carried out, the actual line pressure (line pressure actual pressure) at sub-O/P+mechanical O/P region is started to be raised from point B (B) (FIG. 18).

Figure 19:
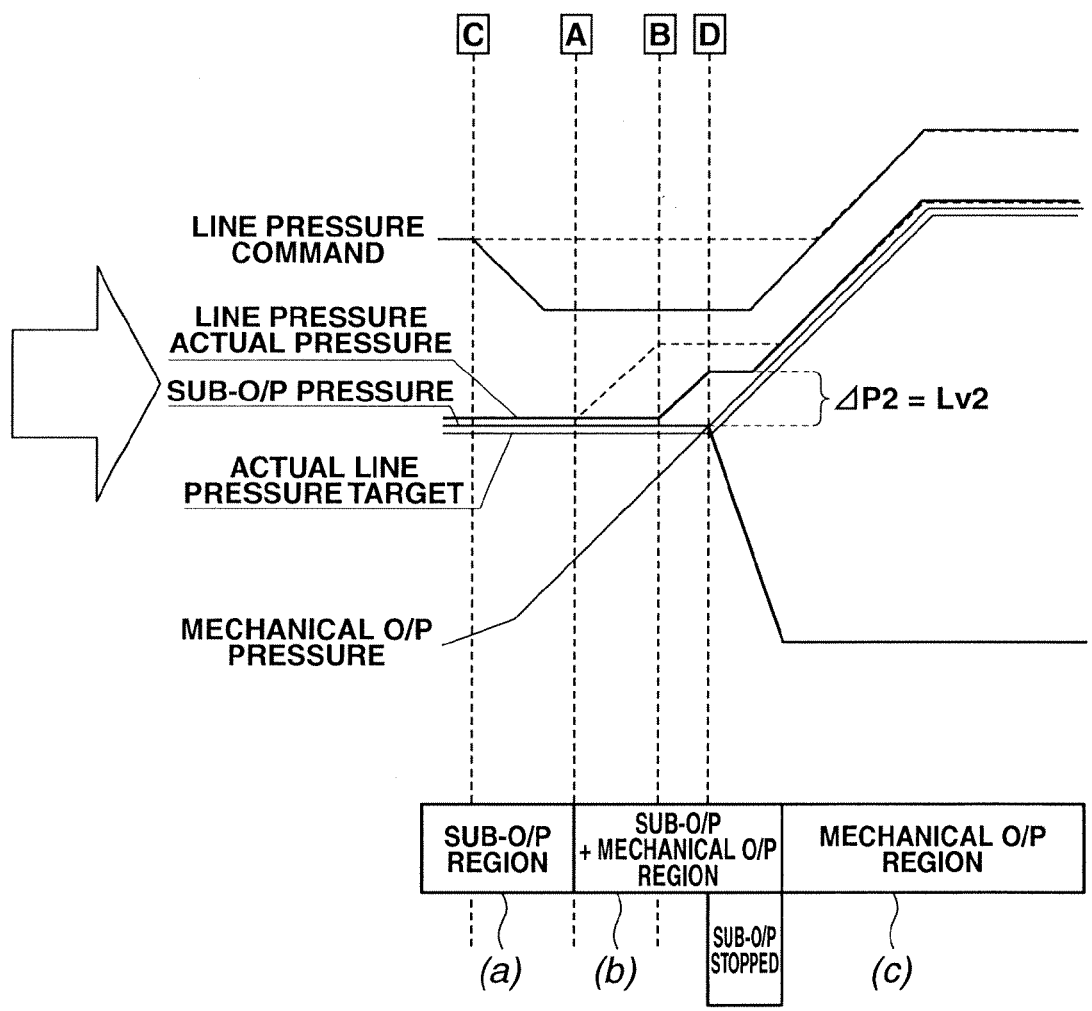
FIG. 19 is a timing chart representing each characteristic for explaining a second learning value calculation procedure (a storage of second learning value Lv2 at point D) in the line pressure control carried out when the hydraulic pressure source is transferred from the electrically operated oil pump to the mechanical oil pump in the preferred embodiment.

(7) Thereafter, point D at which the sub-O/P (electrically driven oil pump) is directed toward the stop and its instantaneous actual line pressure (line pressure actual pressure) is detected (FIG. 19).

Figure 20:
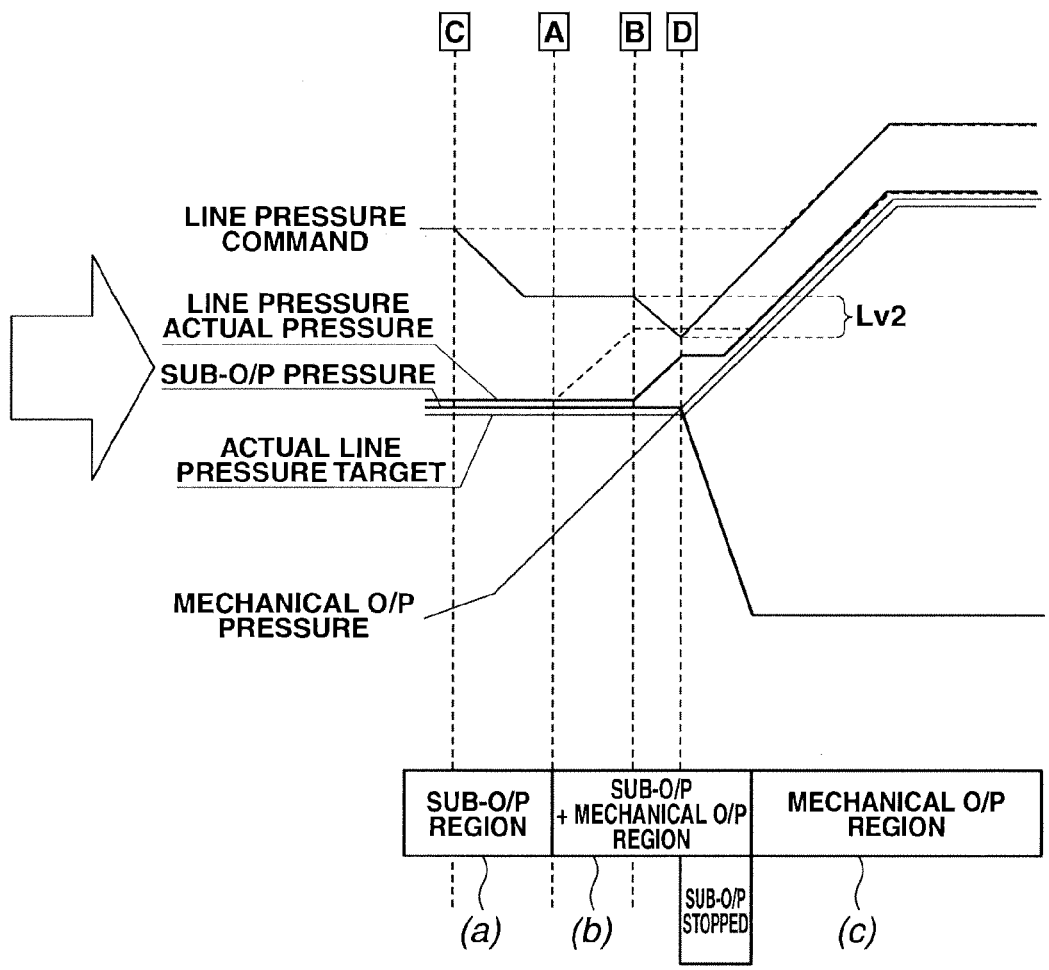
FIG. 20 is a timing chart representing each characteristic of the line pressure command, the line pressure actual pressure, sub OP (SUB O/P) pressure, actual line pressure target, and the mechanical OP pressure in the line pressure control carried out when the hydraulic pressure source is transferred from the electrically driven oil pump to the mechanical oil pump (M-O/P) and the CL2 slip control is not intervened after the learning value calculation processing in the preferred embodiment.

(8) At this time, pressure difference ΔP2 between the actual line pressure (line pressure actual pressure) at sub. O/P+mechanical O/P region and the target pressure (actual line pressure target) is detected and this difference is stored as second learning value Lv2 (FIG. 20).

It should be noted that, at a time of the vehicle start at the subsequent time or more, the line pressure command is reduced by first learning value Lv1 from point C by first learning value Lv1, further, the line pressure command is reduced by second learning value Lv2 from point B, and the present process is ended. At this time, the state transition occurs to the ordinary control. Or, if the stop processing is entered (point D), the state transition is made to the ordinary control. Thereafter, an arbitrary updating is carried out while a relation between the actual line pressure (line pressure actual pressure) and the target pressure (actual line pressure target) is detected. For example, when the line pressure controls using decided learning values Lv1, Lv2 are carried out, the learning is restarted when the difference between the actual line pressure (line pressure actual pressure) and the target pressure (actual line pressure target) at the time of transition of the hydraulic pressure source is equal to or higher than a set value in accordance with the processing procedure of (1) through (8) to update first learning value Lv1 and second learning value Lv2.

Next, the effects (advantages) of the line pressure control apparatus for the vehicle in the preferred embodiment will be described below.

(1) The line pressure control apparatus for the vehicle, which comprises; a mechanical oil pump (M-O/P) pumping actuated by a drive through a traveling driving source (engine Eng, motor•generator MG); an electrically driven oil pump (Sub-O/P) disposed in parallel to the mechanical oil pump on a hydraulic pressure circuit and pumping actuated by the drive through an electrically operated motor (S-M); and a line pressure controller (AT controller 7) configured to output a line pressure command which produces a line pressure which is a basic pressure of a controlled hydraulic pressure for at least one hydraulic pressure engagement frictional element arranged in a drive train, with each or either of the mechanical oil pump and the electrically driven oil pump as a hydraulic pressure source, wherein the line pressure controller (AT controller 7) outputs a line pressure command to reduce an indicated pressure from an initial stage indicated pressure toward a required indicated pressure by which the required pressure can be secured and which is lower than the initial stage indicated pressure, while the state enters a first region in which a discharge pressure of mechanical oil pump (M-O/P) can be confirmed and outputs the line pressure command to hold the indicated pressure at a value thereof at a time point at which first region (a) is ended (during the second region (b)) while the state falls in second region (b) in which both of the electrically driven oil pump (Sub-O/P) and the mechanical oil pump (M-O/P) are the hydraulic pressure sources (FIG. 11). Therefore, the line pressure control which can achieve a compatibility between an improvement in the fuel economy performance and the prevention of the generation of judder can be carried out.

(2) The hydraulic pressure engagement frictional element is a clutch (second clutch CL2) which performs a slip control to make a slip engagement of the clutch at a predetermined traveling mode (WSC mode) and the line pressure controller includes a slip control intervention corresponding control section (step S7 through step S12 in FIG. 11) configured to output the line pressure control command to reduce the line pressure from the indicated pressure at a time point at which the first region is ended while no slip control is executed in the second region (b) in which both of the electrically driven oil pump and the mechanical oil pump are the hydraulic pressure sources and output the line pressure command to hold the indicated pressure at the value at the time of transition of the slip control when the slip control is executed. Therefore, in addition to the effect (1), while the improvement in the fuel economy performance at second region (b) at the time of non-execution of the slip control of the clutch (second clutch CL2) is achieved, a prevention of the generation of judder can be assured when the slip control (second clutch CL2) is executed.

(3) The line pressure controller (AT controller 7) includes a learning value calculation section (FIG. 7, FIG. 8) configured to measure the actual line pressure at the second region and determine the learning value based on a difference between the actual line pressure and the target line pressure, with the indicated pressure reduction width at the line pressure control as the learning value, when the hydraulic pressure source is transferred (transitioned) from the electrically driven oil pump to the mechanical oil pump. Therefore, in addition to the effect of (1) or (2), the variance of the characteristic of the unit that naturally has is absorbed and a stable line pressure PL can be achieved by performing the pressure regulation by first and second learning values Lv1, Lv2. In addition, irrespective of the variance of the characteristic in the unit that naturally has, the line pressure control apparatus can control line pressure PL having the high fuel economy performance in which a wasteful consumption of fuel can be suppressed (4) The learning value calculation section (FIG. 7) measures an actual line pressure at the second region and decides the first learning value to an indicated pressure reduction width at the first region when such a line pressure control as to hold the line pressure command which achieves an initial stage indicated pressure preset to be higher than the required pressure at the first and second regions (a) (b) is carried out. Therefore, in addition to the effect of (3), first learning value Lv1 which is the indicated pressure reduction width at which target hydraulic pressure is securable at first region (a) can be obtained with a high accuracy without overlapping the learning experience at multiple times.

(5) The learning value calculation section (FIG. 8) measures the actual line pressure at second region (b), calculates the difference between the actual line pressure and the target line pressure as the second learning value, and decides second learning value Lv2 as the pressure reduction width at second region (b), when the line pressure control such that, with the first learning value as the indicated pressure reduction width at the first region, the indicated pressure reduction width is reduced from an initial stage indicated pressure at the first region and the reduced indicated pressure at the second region is held by the line pressure command is carried out.
Therefore, in addition to the effect (4), second learning value Lv2 which is the indicated pressure reduction width by which the target hydraulic pressure is securable at second region (b) can accurately be obtained using previously retrieved first learning value Lv1 without the learning experiences by the multiple number of times.

The line pressure control apparatus for the vehicle according to the present invention has been explained on a basis of the preferred embodiment. However, the specific structure is not limited to this and various changes and modifications may be made without departing from the scope of the present invention.

In the preferred embodiment, the line pressure controls (contents of the line pressure control) are made different (differentiated) dependent upon the execution of or the non-execution of the CL2 slip control when the hydraulic pressure source is transferred (transitioned) from electrically driven oil pump (Sub-O/P) to mechanical oil pump (M-O/P). However, as the line pressure controller, the same line pressure control as the reduction in the indicated pressure at the first region and as the indicated pressure holding at the second region may be carried out independent upon the execution or the non-execution of the clutch slip control.

In the preferred embodiment, when the hydraulic pressure is transferred (transitioned) from electrically driven oil pump Sub-O/P to mechanical oil pump M-O/P, first learning value Lv1 is the target value of the reduction in the indicated hydraulic pressure and second learning value Lv2 is the target value of the indicated pressure reduction. However, when the hydraulic pressure source is transferred, either "required indicated pressure" or "reduction width from the initial stage indicated pressure" is (empirically) preset on a basis of experiments. Then, for a time duration at which the first region is carried out, the line pressure command may be outputted which reduces the indicated pressure toward "the required indicated pressure" or toward "the reduction width of the indicated pressure" from the indicated pressure at the time of start of second region (b). It should be noted that the required indicated pressure at the first region is lower than the initial stage indicated pressure and is the indicated pressure higher than the required pressure but may be determined according to the indicated pressure by which the required pressure can assuredly be secured.

In the preferred embodiment, as the learning value calculation section, difference pressures ΔP1, ΔP2 between the actual hydraulic pressure and the target hydraulic pressure at second region (b) when two different line pressure controls are experienced as the first learning value and second learning values Lv1, Lv2. However, as the learning value calculation section, whenever the line pressure control when a predetermined learning condition is established is experienced, a magnitude relationship between the actual hydraulic pressure and the target hydraulic pressure is determined and the first learning value and the second learning value may be obtained so that the actual line pressure approaches to the target hydraulic pressure by the learning correction quantity predetermined by a one-time learning experience.

In the preferred embodiment, the line pressure control apparatus for the vehicle according to the present invention is applicable to the hybrid vehicle in which the drive system equipped in the step geared automatic transmission and having one-motor, two-clutch system which performs CL2 slip control at the time of the vehicle start when "WSC mode" is selected. However, the present invention is not limited to this. The line pressure control apparatus for the vehicle is applicable to the hybrid vehicle having the drive train in which a continuously variable transmission is mounted. The present invention is applicable to an engine mounted vehicle performing an idle stop control function or an electric (automotive) vehicle performing the same idle stop control function. In the case of the engine mounted vehicle or the electric vehicle, at the time of the vehicle stop (the engine or traveling motor is stopped), with the electrically driven oil pump as the hydraulic pressure source, when the vehicle is started from the stopped state, the hydraulic pressure source is transferred from the electrically driven oil pump to the electrically driven oil pump. Then, in a case where the vehicle is started with a starting clutch slip engaged, the problem of judder can be generated.

According to the present invention, there is provided a line pressure control apparatus for a vehicle, comprising: a mechanical oil pump pumping actuated by a drive through a traveling drive source; an electrically driven oil pump disposed in parallel to the mechanical oil pump on a hydraulic pressure circuit and pumping actuated by the drive through an electrically operated motor; and a line pressure controller configured to output a line pressure command to produce a line pressure which is a basic pressure of a controlled hydraulic pressure for a predetermined hydraulic pressure engagement frictional element arranged in a drive train, with either or each of the mechanical oil pump and the electrically driven oil pump as a hydraulic pressure source, wherein the line pressure controller is configured to output the line pressure command to reduce an indicated pressure toward a required indicated pressure by which a required pressure can be secured and which is lower than an initial stage indicated pressure from the initial stage indicated pressure preset to be higher than the required pressure, while a state of each of the electrically driven oil pump and the mechanical oil pump enters a first region in which only the electrically driven oil pump is the hydraulic pressure source and a discharge pressure of the mechanical oil pump can be confirmed, and outputs the line pressure command to hold the indicated pressure at a time point at which the first region is ended, while the state of each of the electrically driven oil pump and the mechanical oil pump enters a second region in which both of the electrically driven oil pump and the mechanical oil pump are the hydraulic pressure sources, when the hydraulic pressure source is transitioned from the electrically driven oil pump to the mechanical oil pump.

Thus, when the hydraulic pressure source is transitioned (transferred) from the electrically driven oil pump to the mechanical oil pump, during the first region in which the electrically driven oil pump is the hydraulic pressure source, the line pressure command is outputted to reduce the indicated line pressure toward the required indicated pressure by which the required pressure can be secured (for example, the learning value obtained by the learning control) and which is lower than the initial stage indicated pressure from the initial stage indicated pressure preset to be higher than the required pressure (for example, the learning value obtained by the learning control). The reduction of the indicated pressure is achieved by, for example, a moderate reduction slope characteristic or a stepwise reduction characteristic. Therefore, the improvement in the fuel economy can be achieved as compared with a case where the initial stage indicated pressure preset to be higher than the required pressure at the first region is held at the same value. While the state enters the second region in which both of the electrically driven oil pump and the mechanical oil pump are the hydraulic pressure sources, the line pressure command to hold the indicated pressure at the end of the first region (=at the time of transition to the second region) is outputted. Therefore, at the second region, the judder generated in a case where such a slip control that the clutch pressure is feedback controlled, for example, to make the predetermined hydraulic pressure engagement frictional element (clutch) a predetermined difference revolution is executed is prevented. The judder is generated when the clutch slip control is intervened in the line pressure control, an interference between the reduction in the line pressure control and the feedback control of the clutch pressure during the slip control occurs, an actual clutch pressure variation is induced, and the variation in the clutch pressure occurs.

Consequently, when the hydraulic pressure source is transferred from the electrically driven oil pump to the mechanical oil pump, the line pressure control which achieves the compatibility between the improvement in the fuel economy performance and the prevention of judder generation due to the interference against the clutch slip control can be performed.

This application is based on a prior Japanese Patent Application No. 2011-277344 filed in Japan on Dec. 19, 2011. The entire contents of this Japanese Patent Application No. 2011-277344 are hereby incorporated by reference. Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A line pressure control apparatus for a vehicle, comprising:
   a mechanical oil pump pump-actuated by a drive through a traveling drive source;
   an electrically driven oil pump disposed in parallel to the mechanical oil pump on a hydraulic pressure circuit and pump-actuated by the drive through an electrically operated motor; and
   a line pressure controller configured to:
      output a line pressure command to produce a line pressure which is a basic pressure of a controlled hydraulic pressure for a predetermined hydraulic pressure engagement frictional element arranged in a drive train, with one or both of the mechanical oil pump and the electrically driven oil pump configurable as a hydraulic pressure source, output the line pressure command to reduce an indicated pressure toward a required indicated pressure ensuring that a required pressure is secured and which is lower than an initial stage indicated pressure, the initial stage indicated pressure being preset to be higher than the required pressure, while a state of each of the electrically driven oil pump and the mechanical oil pump enters a first region in which only the electrically driven oil pump is the hydraulic pressure source and a discharge pressure of the mechanical oil pump is ensured, and output the line pressure command to maintain a held indicated pressure at a time point at which the first region is ended, while the state of each of the electrically driven oil pump and the mechanical oil pump enters a second region in which both of the electrically driven oil pump and the mechanical oil pump are hydraulic pressure sources, while the hydraulic pressure source is transitioned from the electrically driven oil pump to the mechanical oil pump via the first region and the second region.

2. The line pressure control apparatus for the vehicle as claimed in claim 1, wherein the predetermined hydraulic pressure engagement frictional element is a clutch arranged in the drive train and in which a slip control such that a slip engagement of the clutch in a predetermined traveling mode is executed, and the line pressure controller includes a slip control intervention corresponding control section configured to:

output the line pressure command to reduce, further, the indicated pressure from the indicated pressure toward the required indicated pressure at a time point at which the first region is ended, while no slip control is executed, and output the line pressure command to maintain the held indicated pressure at a time point of a transfer to the slip control while the slip control is executed, in the second region in which both of the electrically driven oil pump and the mechanical oil pump are the hydraulic pressure sources.

3. The line pressure control apparatus as claimed in claim 1, wherein the line pressure controller includes a learning value calculation section configured to:

measure an actual line pressure at the second region, and determine a learning value based on a difference between the actual line pressure and a target line pressure, with an indicated pressure reduction width in the line pressure control as the learning value, while the hydraulic pressure source is transitioned from the electrically driven oil pump to the mechanical oil pump.

4. The line pressure control apparatus for the vehicle as claimed in claim 3, wherein the learning value calculation section is further configured to measure the actual line pressure at the second region, calculate a difference between the actual line pressure and the target line pressure as a first learning value, and determine the first learning value to be the indicated pressure reduction width at the first region while a line pressure control is carried out to hold the line pressure command which achieves the initial stage indicated pressure that is preset to be higher than the required pressure at each of the first and second regions.

5. The line pressure control apparatus for the vehicle as claimed in claim 4, wherein the learning value calculation section is configured to measure the actual line pressure at the second region, calculate the difference between the measured actual line pressure and the target line pressure as a second learning value, and determine the second learning value to be the indicated pressure reduction width at the second region, while the line pressure control is carried out such that, with the first learning value as the indicated pressure reduction width at the first region, the indicated pressure reduction width is reduced from the initial stage indicated pressure at the first region and a reduced indicated pressure at the second region is held by the line pressure command.

6. A line pressure control method for a vehicle, comprising:
providing a mechanical oil pump pump-actuated by a drive through a traveling drive source; and
providing an electrically driven oil pump disposed in parallel to the mechanical oil pump on a hydraulic pressure circuit and pump-actuated by the drive through an electrically operated motor; and
outputting a line pressure command through a line controller, the outputting comprising:
outputting the line pressure command through the line pressure control to produce a line pressure which is a basic pressure of a controlled hydraulic pressure for a predetermined hydraulic pressure engagement frictional element arranged in a drive train, with one or both of the mechanical oil pump and the electrically driven oil pump configurable as a hydraulic pressure source,
outputting the line pressure command through the line pressure controller to reduce an indicated pressure toward a required indicated pressure ensuring that a required pressure is secured and which is lower than an initial stage indicated pressure, the initial stage indicated pressure being preset to be higher than the required pressure, while a state of each of the electrically driven oil pump and the mechanical oil pump enters a first region in which only the electrically driven oil pump is the hydraulic pressure source and a discharge pressure of the mechanical oil pump is ensured, and
outputting the line pressure command through the line pressure controller to maintain a held indicated pressure at a time point at which the first region is ended, while the state of each of the electrically driven oil pump and the mechanical oil pump enters a second region in which both of the electrically driven oil pump and the mechanical oil pump are hydraulic pressure sources, while the hydraulic pressure source is transitioned from the electrically driven oil pump to the mechanical oil pump via the first region and the second region.

* * * * *